(12) United States Patent
Katagiri et al.

(10) Patent No.: US 6,893,338 B2
(45) Date of Patent: May 17, 2005

(54) AIR-CONDITIONING REGISTER

(75) Inventors: Katsuhiro Katagiri, Aichi (JP); Shigeru Yabuya, Aichi (JP); Minoru Shibata, Aichi (JP); Masanobu Muto, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 72 days.

(21) Appl. No.: 10/465,557

(22) Filed: Jun. 20, 2003

(65) Prior Publication Data

US 2004/0038643 A1 Feb. 26, 2004

(30) Foreign Application Priority Data

| Jun. 21, 2002 | (JP) | ................................. P2002-181837 |
| Sep. 6, 2002 | (JP) | ................................. P2002-261607 |
| Jan. 30, 2003 | (JP) | ................................. P2003-022314 |

(51) Int. Cl.[7] .............................. B60H 1/34; F25D 17/04
(52) U.S. Cl. ........................................ 454/155; 62/408
(58) Field of Search ........................... 62/408, 407, 404, 62/265; 454/155, 322, 314, 327

(56) References Cited

U.S. PATENT DOCUMENTS 6,059,652 A * 5/2000 Terry et al. ................. 454/155

6,464,577 B2 * 10/2002 Shigeno et al. ............. 454/155

FOREIGN PATENT DOCUMENTS

| JP | U-H2-2220 | 1/1990 |
| JP | U-H4-20949 | 2/1992 |
| JP | A-2000-318439 | 11/2000 |

* cited by examiner

*Primary Examiner*—Cheryl J. Tyler
*Assistant Examiner*—Filip Zec
(74) *Attorney, Agent, or Firm*—Posz & Bethards, PLC

(57) ABSTRACT

An air-conditioning register includes: a register panel exhibited in a compartment and having an opening for flowing out conditioned air; a retainer provided so as to cave in the register panel and having an air passage communicating with the opening; a vertical fin unit including vertical fins received in the retainer and capable of adjusting a wind direction of the conditioned air horizontally; a horizontal fin unit including horizontal fins received in the retainer and capable of adjusting a wind direction of the conditioned air vertically; and an open/close damper received in the retainer and capable of opening/closing the air passage. The air-conditioning register further includes a common operation portion capable of operating the vertical fin unit, the horizontal fin unit and the open/close damper.

17 Claims, 30 Drawing Sheets

AIR-CONDITIONING REGISTER

The present application is based on Japanese Patent Application No. 2003-22314, the entire contents of which are incorporated herein by reference.

BACKGROUND OF THE INVENTION

1. Field of the Invention

The present invention relates to an air-conditioning register and particularly to an air-conditioning register which makes an air-conditioning duct communicate with a compartment for adjusting the wind direction of conditioned air, the flow rate of conditioned air, etc.

2. Related Art

An air-conditioning register is a device by which conditioned air temperature-controlled and humidity-controlled by an air conditioner is supplied into a compartment. For example, an air-conditioning register having common operation portions capable of operating a vertical fin unit and a horizontal fin unit has been shown in Patent Document 2. FIG. 34 is a rear view of the air-conditioning register described in Patent Document 2. As shown in FIG. 34, the air-conditioning register 100 includes a retainer 101, a vertical fin unit 102, a horizontal fin unit 103, and common operation portions 104. The retainer 101 is tubular. An opening 105 is formed at an end of the retainer 101 in a direction of the compartment (backward direction). The retainer 101 is separated into left and right parts by a partition wall 106. The vertical fin unit 102 includes four vertical fins disposed on the left side of the partition wall 106, and four vertical fins disposed on the right side of the partition wall 106, that is, eight vertical fins in total. The four vertical fins 102 on each side of the partition wall 106 are connected to one another by a vertical fin connection rod 107. The horizontal fin unit 103 includes four horizontal fins disposed on the left side of the partition wall 106, and four horizontal fins disposed on the right side of the partition wall 106, that is, eight horizontal fins in total. The four horizontal fins 103 on each side of the partition wall 106 are connected to one another by a horizontal fin connection rod 108. The common operation portions 104 are disposed at left and right corners of the retainer 101. The common operation portions 104 are provided so as to protrude toward the compartment.

When, for example, a passenger moves up/down the common operation portion 104 on the right side of the partition wall 106, the four horizontal fins 103 connected by the horizontal fin connection rod 108 swing up/down. The wind direction of conditioned air can be adjusted in an up/down direction by this swinging.

Similarly, when a passenger moves left/right the common operation portion 104 on the right side of the partition wall 106, the four vertical fins 102 connected by the vertical fin connection rod 107 swing left/right. The wind direction of conditioned air can be adjusted in a left/right direction by this swinging.

(Patent Document 1)
Japanese Patent Laid-Open No. 2000-318439 (pp. 3–4, FIG. 1)

(Patent Document 2)
Japanese Utility Model Laid-Open No. 2220/1990 (pp. 4–7, FIGS. 1 and 2)

(Patent Document 3)
Japanese Utility Model Laid-Open No. 20949/1992

Incidentally, an open/close damper is disposed in the air-conditioning register 100. The open/close damper is a member for opening/closing an air passage of conditioned air to thereby open/close a flow of the conditioned air. According to the air-conditioning register 100 described in Patent Document 2, nothing but the vertical fin unit 102 and the horizontal fin unit 103 can be operated by the common operation portions 104. That is, the open/close damper cannot be operated by the common operation portions 104. In the case of the air-conditioning register 100 described in Patent Document 2, it is therefore necessary to separately provide an operation portion for exclusive use of the open/close damper. Hence, according to the air-conditioning register 100 described in Patent Document 2, the number of parts is large. Further, the air-conditioning register 100 described in Patent Document 2 is complex in structure. Further, the cost of production of the air-conditioning register 100 described in Patent Document 2 is high.

Patent Document 1 has shown an air-conditioning register having common operation portions capable of operating a vertical fin unit and a horizontal fin unit respectively. On the other hand, Patent Document 2 or 3 has shown an air-conditioning register having common operation portions capable of operating a vertical fin unit and a horizontal fin unit simultaneously. According to the air-conditioning register described in Patent Document 2 or 3, the wind direction of conditioned air can be adjusted vertically and horizontally at once, that is, obliquely. Hence, the air-conditioning register described in Patent Document 2 or 3 is excellent in handling property.

According to the air-conditioning register described in Patent Document 2 or 3, there are however used ball joints which are spherical joints for connecting members. The vertical fin unit and the horizontal fin unit are operated at once by the ball joints. A spherical surface of each of the ball joints requires high surface accuracy for obtaining a good handling feeling. Particularly, sphericity has large influence on the handling feeling. A ball joint high in surface accuracy, especially high in sphericity is expensive. Hence, the cost of production of the air-conditioning register described in Patent Document 2 or 3 is high.

SUMMARY OF THE INVENTION

An air-conditioning register according to the invention is accomplished in consideration of the aforementioned problem. Therefore, an object of the invention is to provide an air-conditioning register having a common operation portion that can operate an open/close damper as well as a vertical fin unit and a horizontal fin unit. Another object of the invention is to provide an air-conditioning register having a fin operation device that can operate the vertical fin unit and the horizontal fin unit simultaneously without use of any ball joint.

(1) To solve the problem, the invention provides an air-conditioning register including: a register panel exhibited in a compartment and having an opening for conditioned air; a retainer provided so as to cave in the register panel and having an air passage communicating with the opening; a vertical fin unit including vertical fins received in the retainer and capable of adjusting a wind direction of the conditioned air horizontally; a horizontal fin unit including horizontal fins received in the retainer and capable of adjusting a wind direction of the conditioned air vertically; and an open/close damper received in the retainer and capable of opening/closing the air passage, wherein the air-conditioning register further includes a common operation portion capable of operating the vertical fin unit, the horizontal fin unit and the open/close damper.

That is, the air-conditioning register according to the invention has a common operation portion capable of integrally operating not only the vertical fin unit and the horizontal fin unit but also the open/close damper. In the air-conditioning register according to the invention, it is unnecessary to separately dispose any operation portion for exclusive use of the open/close damper. Accordingly, the number of parts for forming the air-conditioning register according to the invention can be reduced. Furthermore, the air-conditioning register according to the invention is simple in structure. In addition, the cost for production of air-conditioning register according to the invention is low.

(2) Preferably, the common operation portion is disposed in the outside of the opening. When a member such as the common operation portion 104 is disposed in the opening 105 as shown in FIG. 34, conditioned air hardly flows. Accordingly, air resistance becomes high and pressure loss becomes high.

In terms of this point, in the air-conditioning register according to this configuration, the common operation portion is disposed in the outside of the opening. Accordingly, there is no fear that the flow of conditioned air may be disturbed by the common operation portion. Accordingly, the air-conditioning register according to this configuration is low in air resistance. In addition, the air-conditioning register according to this configuration is low in pressure loss.

(3) Preferably, the common operation portion is made of a common operation stick which opens the open/close damper when operated to protrude from the register panel, which closes the open/close damper when operated to be inserted in the register panel from a position of protrusion, which moves up/down the horizontal fin unit when operated to move up/down in the position of protrusion and which moves left/right the vertical fin unit when operated to move left/right in the position of protrusion.

The term "position of protrusion" means a position of the common operation stick protruded from the register panel toward the compartment. In the air-conditioning register according to this configuration, the vertical fin unit, the horizontal fin unit and the open/close damper are operated by only one common operation stick. The protruding/inserting motion of the common operation stick is interlocked with the opening/closing motion of the open/close damper. The up/down motion of the common operation stick at the position of protrusion is interlocked with the up/down motion of the horizontal fin unit. The left/right motion of the common operation stick at the position of protrusion is interlocked with the left/right motion of the vertical fin unit.

In the air-conditioning register according to this configuration, the operating direction interlocked with the open/close damper clearly differs from the operating direction interlocked with the vertical fin unit or horizontal fin unit. Accordingly, even in the case where the passenger is driving the car, the operation of the open/close damper and the operation of the vertical fin unit or horizontal fin unit can be easily distinguished from each other by only the operating feeling. That is, the air-conditioning register according to this configuration is excellent in handling property.

(4) Preferably, the common operation stick has a front end portion which is substantially flush with the register panel when the common operation stick is located in a position of insertion. The term "position of insertion" means a position of the common operation stick getting into the car exterior side on the panel from the position of protrusion. In the air-conditioning register according to this configuration, when the common operation stick is located in the position of insertion, that is, when the open/close damper is located in the close position, the front end portion of the common operation stick is disposed substantially flush with the register panel. Accordingly, there can be obtained a high degree of uniformity design of the front end portion of the common operation stick with the register panel.

(5) Preferably, the common operation stick can is inserted in the register panel even in the case where the common operation stick in the position of protrusion is inclined to a direction of insertion. When the common operation stick at the position of protrusion is moved left/right/up/down, the vertical fin unit and the horizontal fin unit can be operated. For this reason, after the operation of the vertical/horizontal fin unit, the common operation stick at the position of protrusion is inclined to the direction of insertion. It is therefore necessary to correct the inclination in parallel to the direction of insertion before the open/close damper is closed.

In terms of this point, the common operation stick according to this configuration, however, can be inserted even in the case where the common operation stick at the position of protrusion is inclined to the direction of insertion. Accordingly, when the open/close damper is to be closed, the common operation stick can be inserted soon even in the case where the common operation stick is inclined. Accordingly, the common operation stick according to this configuration is excellent in handling property at the time of operating the open/close damper.

(6) Preferably, the common operation portion is a swinging operation portion disposed in the outside of the opening and capable of swinging, and the swinging operation portion swings left/right the vertical fin unit when operated to swing left/right, swings up/down the horizontal fin unit when operated to swing up/down, and opens/closes the open/close damper when operated to swing beyond a maximum swinging position of the vertical fin unit or the horizontal fin unit.

That is, in the air-conditioning register according to this configuration, the vertical fin unit, the horizontal fin unit and the open/close damper are operated by only one swinging operation portion. The left/right swinging of the swinging operation portion is interlocked with the left/right swinging of the vertical fin unit. The up/down swinging of the swinging operation portion is interlocked with the up/down swinging of the horizontal fin unit. The term "maximum swinging position" means a limit position of swinging of the vertical fin unit or horizontal fin unit. That is, the vertical fin unit and the horizontal fin unit cannot swing beyond the maximum swinging position. When the swinging operation portion is further swung though the vertical fin unit or horizontal fin unit has reached the maximum swinging position, the open/close damper is opened/closed. That is, the swinging of the swinging operation portion is interlocked with the opening/closing motion of the open/close damper as well as the swinging of the vertical fin unit and the swinging of the horizontal fin unit.

In the air-conditioning register according to this configuration, the open/close damper as well as the vertical fin unit and the horizontal fin unit can be operated simply when the swinging operation portion is swung. Accordingly, the air-conditioning register is excellent in handling property.

(7) Preferably, a fin unit which is one of the vertical fin unit and the horizontal fin unit and which is nearer to the opening fully closes the air passage when the fin unit is in the maximum swinging position.

When, for example, the horizontal fin unit is nearer to the opening than the vertical fin unit, the air passage can be fully closed by the horizontal fin unit if the swinging operation portion is swung down (up) so that the horizontal fin unit reaches the maximum swinging position. That is, the air passage is blocked with the horizontal fin unit. When the swinging operation portion in this condition is further swung down (up), the open/close damper closes the air passage this time. That is, the air passage is blocked with the open/close damper.

On the other hand, when the vertical fin unit is nearer to the opening than the horizontal fin unit, the vertical fin unit first reaches the maximum swinging position so that the air passage is blocked with the vertical fin unit. Then, the air passage is blocked with the open/close damper.

In the air-conditioning register according to this configuration, the motion of the fin unit nearer to the opening is interlocked with the motion of the open/close damper. Accordingly, the passenger can recognizes that the open/close damper is closed, when the passenger visually recognizes that the fin unit nearer to the opening is fully closed. Hence, according to this configuration, the state of the open/close damper which cannot be visually recognized from the compartment can be recognized indirectly through the state of the fin unit nearer to the opening.

(8) Preferably, the swinging operation portion is disposed so as to protrude from the register panel. According to this configuration, the passenger can handle the swinging operation portion more easily.

(9) To solve the problem, the invention further provides an air-conditioning register including: a register panel exhibited in a compartment and having an opening for conditioned air; a retainer provided so as to cave in the register panel and having an air passage communicating with the opening; a vertical fin unit including vertical fins received in the retainer and capable of adjusting a wind direction of the conditioned air horizontally; and a horizontal fin unit including horizontal fins received in the retainer and capable of adjusting a wind direction of the conditioned air vertically, wherein the air-conditioning register further includes a fin operation device capable of operating the vertical fin unit and the horizontal fin unit simultaneously, the fin operation device including a vertical fin drive portion for driving the vertical fin unit while detecting a horizontal component of an input, and a horizontal fin drive portion provided separately from the vertical fin drive portion for driving the horizontal fin unit while detecting a vertical component of the input.

That is, the air-conditioning register according to the invention has a fin operation device. The fin operation device has a vertical fin drive portion, and a horizontal fin drive portion. When, for example, the fin operation device receives an oblique input (in an intermediate direction between the horizontal direction and the vertical direction) from the passenger, the horizontal component of the input is detected by the vertical fin drive portion. The horizontal component of the input is transmitted to the vertical fin unit to thereby drive the vertical fin unit. On the other hand, the vertical component of the input is detected by the horizontal fin drive portion. The vertical component of the input is transmitted to the horizontal fin unit to thereby drive the horizontal fin unit.

When the fin operation device receives a horizontal input, all the input is detected by the vertical fin drive portion. The input is transmitted to the vertical fin unit to thereby drive the vertical fin unit. When the fin operation device receives a vertical input, all the input is detected by the horizontal fin drive portion. The input is transmitted to the horizontal fin unit to thereby drive the horizontal fin unit.

In the air-conditioning register according to the invention, the vertical fin unit and the horizontal fin unit can be operated simultaneously. Accordingly, the air-conditioning register is excellent in handling property. In the air-conditioning register according to the invention, the fin operation device has the vertical fin drive portion and the horizontal fin drive portion separately. The vertical fin drive portion and the horizontal fin drive portion cooperate to drive the vertical fin unit and the horizontal fin unit simultaneously. It is therefore unnecessary to dispose any expensive ball joint. Accordingly, the cost for production of the air-conditioning register according to the invention is relatively low.

(10) Preferably, in the configuration (9), the horizontal fin drive portion is pivoted on the retainer so as to be able to swing vertically whereas the vertical fin drive portion is pivoted on the horizontal fin drive portion so as to be able to swing horizontally.

According to this configuration, the fin operation device becomes relatively simple in structure. Accordingly, the reliability of the fin operation device is high. In addition, the fin operation device can be assembled easily.

DETAILED DESCRIPTION OF THE PREFERRED EMBODIMENTS

Embodiments of an air-conditioning register according to the invention will be described below.

(1) First Embodiment

Figure 1:
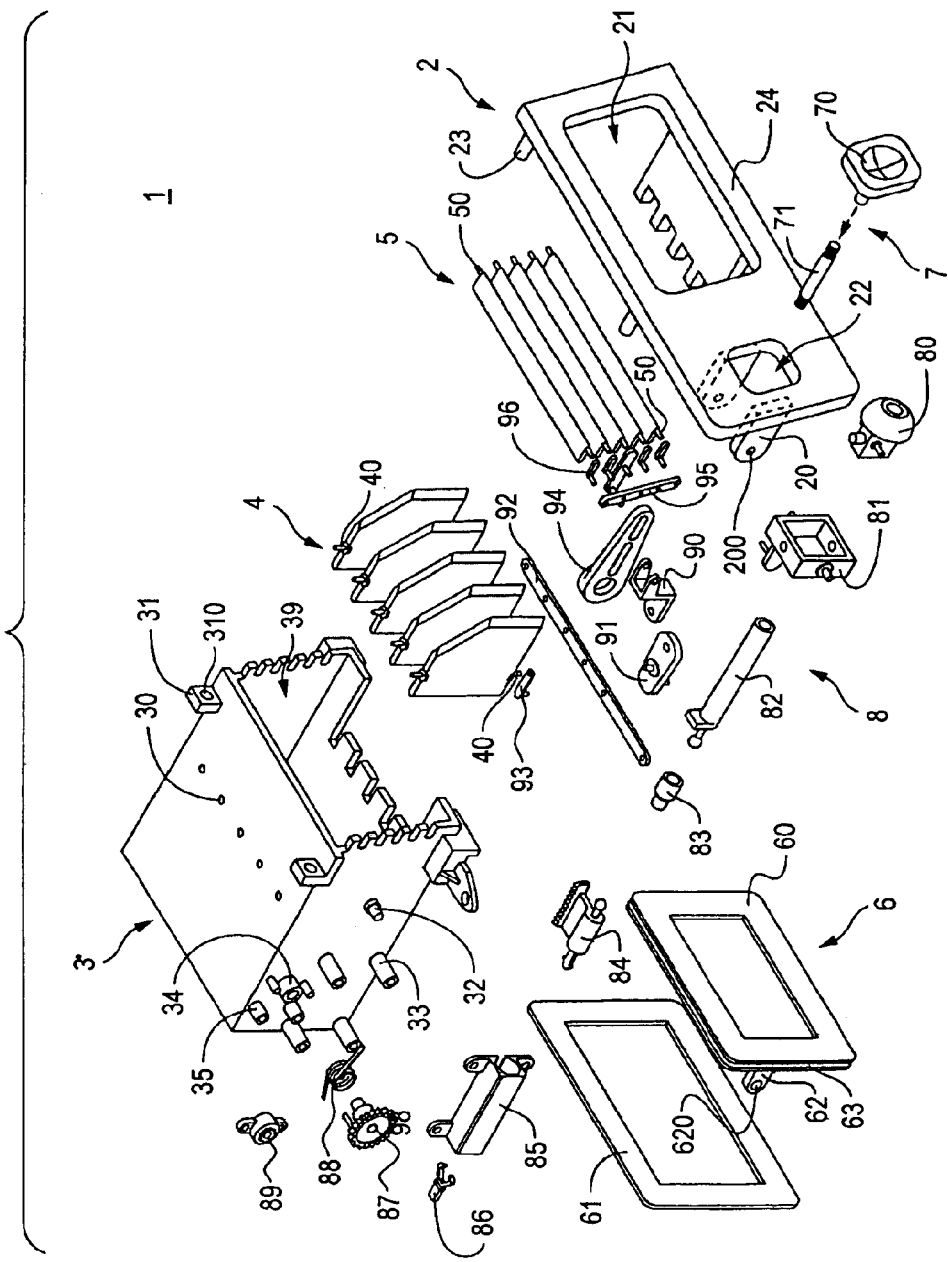
FIG. 1 is an exploded view of an air-conditioning register according to a first embodiment of the invention.

First, the configuration of the air-conditioning register according to this embodiment will be described. FIG. 1 is an exploded view of the air-conditioning register according to this embodiment. The air-conditioning register 1 includes a register panel 2, a retainer 3, a vertical fin unit 4, a horizontal fin unit 5, an open/close damper 6, a common operation stick 7, and a mechanical portion 8.

The register panel 2 is incorporated in an instrument panel (not shown) in front of the compartment. The register panel 2 is made of a resin and shaped like a rectangular plate. The register panel 2 includes a panel body 24, arms 20, an opening 21, an operation port 22, and protrusions 23. The opening 21 is shaped like a rectangle and pierces the panel body 24 between the front and rear surfaces of the panel body 24. The operation port 22 is shaped like a square and pierces the panel body 24 between the front and rear surfaces of the panel body 24. The arms 20 are provided so as to protrude from the rear surface of the panel body 24 toward the car exterior. The arms 20 are disposed as two arms in total on opposite sides of the operation port 22 is the car width direction. A rotary hole 200 is provided at an end of each of the arms 20.

The retainer 3 is made of a resin and shaped like a rectangular pipe. The retainer 3 is disposed in the car exterior direction of the register panel 2. That is, the retainer 3 is provided so as to cave in the register panel 2. Five vertical fin-rotating holes 30 in total are provided in an upper wall of the retainer 3. Panel mount seats 31 are provided so as to be erected on an outer surface of the upper wall of the retainer 3. Panel mount holes 310 are formed in the panel mount seats 31 respectively. An arm shaft 32, casing mount bosses 33, a pinion mount boss 34 and an oil damper mount boss 35 are provided so as to protrude from an outer surface of a side wall of the retainer 3. An inlet and outlet for the air are formed on the retainer 3, so that an air passage 39 is formed in the retainer 3. The air passage 39 communicates with the opening 21.

The vertical fin unit 4 has vertical fins each of which is made of a resin and shaped like a plate. The vertical fins 4 are disposed as five fins in total in the inside of the retainer 3. Vertical fin-rotating shafts 40 are provided so as to protrude from upper and lower ends of the vertical fins 4 respectively. Of these, vertical fin-rotating shafts 40 protruded from upper ends of the vertical fins 4 are rotatably inserted in the vertical fin-rotating holes 30 respectively.

The horizontal fin unit 5 has horizontal fins each of which is made of a resin and shaped like a plate. The horizontal fins 5 are disposed as five fins in the inside of the retainer 3. The horizontal fin unit 5 is disposed on the compartment side of the vertical fin unit 4. Horizontal fin rotating shafts 50 are provided so as to protrude from respective opposite ends of the horizontal fins 5 in the car width direction.

The open/close damper 6 is received in the inside of the retainer 3. The open/close damper 6 includes a damper body 60, and a seal frame 61. The damper body 60 is made of a resin and shaped like a rectangular plate. A damper mount seat 62 is provided at an end of the damper body 60 in the car width direction so as to protrude from the damper body 60. A damper rotation hole 620 is formed in the damper mount seat 62. A groove 63 is concavely provided in the circumferential edge of the damper body 60. The seal frame 61 is made of rubber and shaped like a rectangular ring. The seal frame 61 is fitted into the groove 63.

The common operation stick 7 includes a stick body 71, and a front end portion 70. The common operation stick 7 is disposed so as to pass through the operation port 22. The stick body 71 is made of a resin and shaped like a round rod. The front end portion 70 is made of a resin and shaped like a square plate. The front end portion 70 is thread-engaged with the compartment side end of the stick body 71.

The mechanical portion 8 includes a horizontally rotating member 80, a vertically rotating member 81, a first shaft 82, a shaft connection pipe 83, a second shaft 84, a casing 85, a second shaft bearing 86, a pinion 87, a spring 88, an oil damper 89, a horizontal rotation connection member 90, a horizontally rotating arm 91, a vertical fin connection rod 92, vertical fin drive pieces 93, a vertically rotating arm 94, a horizontal fin connection rod 95, and horizontal fin drive pieces 96. The common operation stick 7 and the vertical fin unit 4 are connected to each other by the mechanical portion 8. Further, the common operation stick 7 and the horizontal fin unit 5 are connected to each other by the mechanical portion 8. In addition, the common operation stick 7 and the open/close damper 6 are connected to each other by the mechanical portion 8. Incidentally, the horizontally rotating member 80 is included in the vertical fin drive portion in the invention. The vertically rotating member 81 is included in the horizontal fin drive portion in the invention.

Figure 2:
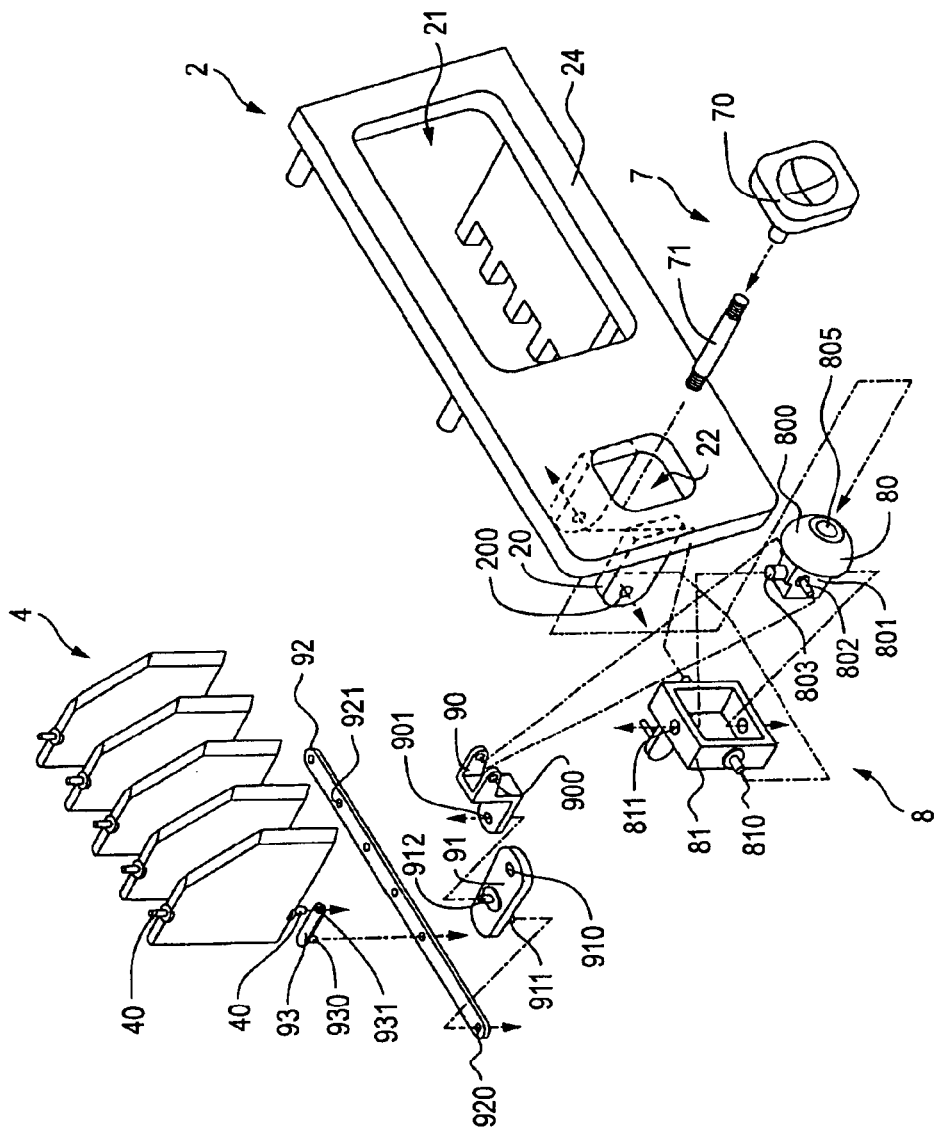
FIG. 2 is an exploded view showing a mechanism of connection between the common operation stick and the vertical fin unit.

First, the mechanism of connection between the common operation stick 7 and the vertical fin unit 4 will be described. FIG. 2 is an exploded view showing the mechanism of connection between the common operation stick and the vertical fin unit. Incidentally, members having no relation to connection between the common operation stick and the vertical fin unit are not shown in FIG. 2.

The horizontally rotating member 80 is made of a resin and includes a hemispherical portion 800, and a rectangular parallelepiped portion 801. A stick though-hole 805 is formed in the horizontally rotating member 80. The spherical surface of the hemispherical portion 800 is revealed out of the operation port 22. The rectangular parallelepiped portion 801 is disposed on the car exterior side of the hemispherical portion 800. Connection member-holding shafts 802 are provided so as to protrude from opposite surfaces of the rectangular parallelepiped portion 801 respectively in the car width direction. Rotary shafts 803 are provided so as to protrude from upper and lower surfaces of the rectangular parallelepiped portion 801 respectively.

The horizontal rotation connection member 90 is made of a resin and shaped like an L figure. The horizontal rotation connection member 90 is disposed in the car exterior direction of the horizontally rotating member 80. Two holding holes 900 in total are disposed at compartment-side ends of the horizontal rotation connection member 90 so as to be opposite to each other in the car width direction. The connection member-holding shafts 802 are inserted in the holding holes 900 respectively. That is, the horizontal rotation connection member 90 and the horizontally rotating member 80 are connected to each other through the holding holes 900 and the connection member-holding shafts 802. On the other hand, an arm connection hole 901 is formed at a car exterior-side end of the horizontal rotation connection member 90.

The horizontally rotating arm 91 is made of a resin and shaped like a rectangular plate. The horizontally rotating arm 91 is disposed under the horizontal rotation connection member 90. A rotation hole 910 is formed at a compartment-side end of the horizontally rotating arm 91. A rod connection shaft 911 is provided so as to protrude downward from the car exterior-side end of the horizontally rotating arm 91. A connection shaft 912 is provided so as to protrude upward from the middle of the horizontally rotating arm 91. The connection shaft 912 is inserted in the arm connection hole 901. That is, the horizontally rotating arm 91 and the horizontal rotation connection member 90 are connected to each other through the connection shaft 912 and the arm connection hole 901.

The vertical fin connection rod 92 is made of a resin and shaped like a slender plate. The vertical fin connection rod 92 is disposed under the horizontally rotating arm 91. An arm connection hole 920 and drive piece connection holes 921 are formed in the vertical fin connection rod 92. The rod connection shaft 911 is inserted in the arm connection hole 920. That is, the vertical fin connection rod 92 and the horizontally rotating arm 91 are connected to each other through the arm connection hole 920 and the rod connection shaft 911.

Each of the vertical fin drive pieces 93 is made of a resin and shaped like a small piece of slender plate. The vertical fin drive pieces 93 are disposed as five pieces in total on the vertical fin connection rod 92. Rod connection shafts 930 are provided so as to protrude from lower surfaces of the vertical fin drive pieces 93 respectively. The rod connection shafts 930 are inserted in the drive piece connection holes 921 respectively. That is, the vertical fin drive pieces 93 are connected to the horizontally rotating arm 91 through the rod connection shafts 930 and the arm connection hole 920. Fin rotation holes 931 are formed in the vertical fin drive pieces 93 respectively. Vertical fin rotation shafts 40 are inserted and fixed into the fin rotation holes 931 respectively. That is, the vertical fin drive pieces 93 are connected to the vertical fins 4 respectively through the fin rotation holes 931 and the vertical fin rotation shafts 40. In this manner, the common operation stick 7 is connected to the vertical fins 4.

Figure 3:
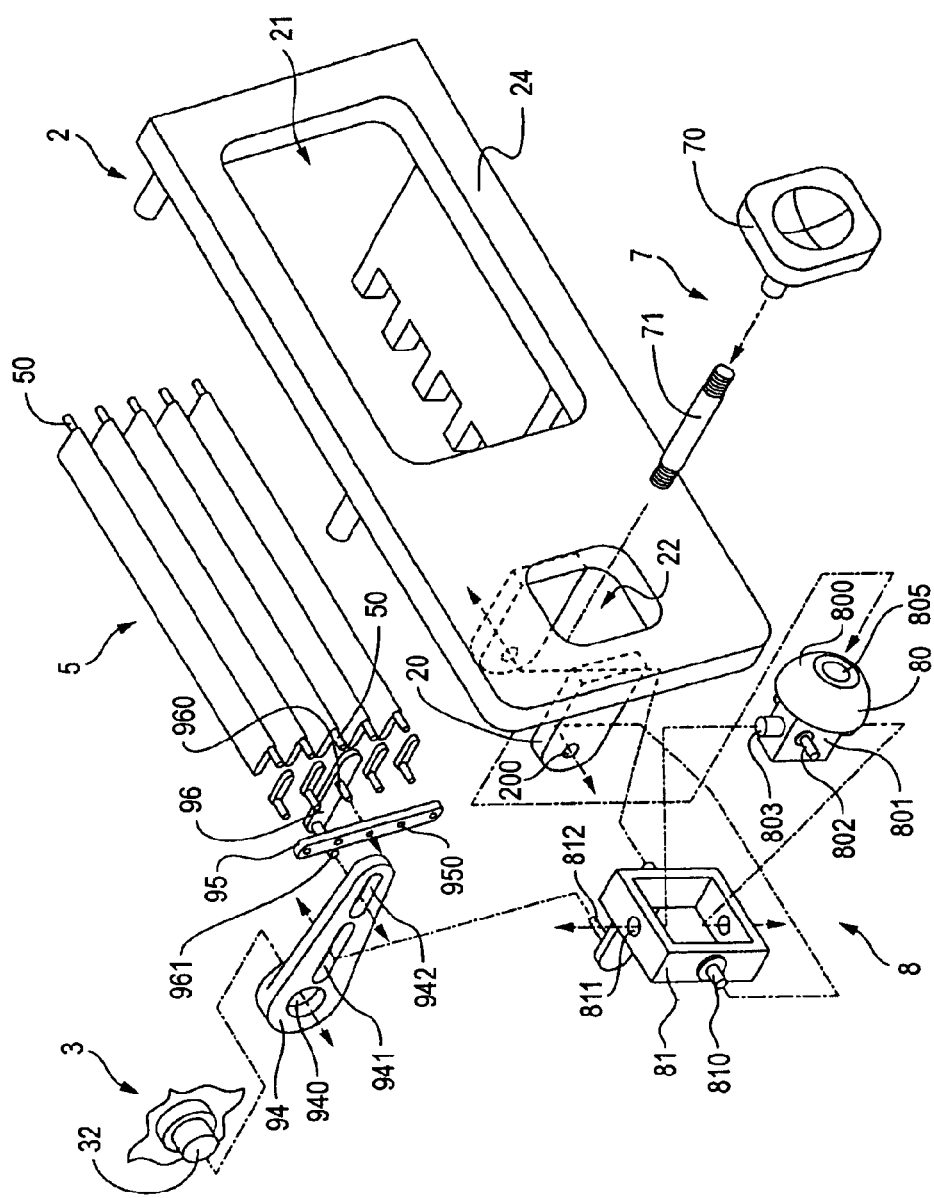
FIG. 3 is an exploded view showing a mechanism of connection between the common operation stick and the horizontal fin unit.

Next, the mechanism of connection between the common operation stick 7 and the horizontal fin unit 5 will be described. FIG. 3 is an exploded view showing the mechanism of connection between the common operation stick and the horizontal fin unit. Incidentally, members having no relation to the connection between common operation stick and the horizontal fin unit are not shown in FIG. 3.

The vertically rotating member 81 is made of a resin and shaped like a square ring. The vertically rotating member 81 is disposed on the outer circumferential side of the horizontally rotating member 80. Rotation shafts 810 are provided so as to protrude from opposite surfaces of the vertically rotating member 81 in the car width direction. Rotation holes 811 are formed in upper and lower walls of the vertically rotating member 81. The rotation shafts 803 are inserted in the rotation holes 811 respectively. That is, the vertically rotating member 81 and the horizontally rotating member 80 are connected to each other through the rotation holes 811 and the rotation shafts 803. A slide protrusion 812 is provided so as to protrude sideward from a car exterior-side end of the vertically rotating member 81.

The vertically rotating arm 94 is made of a resin and shaped like a rectangular plate. A rotation hole 940 is formed at a car exterior-side end of the vertically rotating arm 94. The arm shaft 32 of the retainer 3 is inserted in the rotation hole 940. A first slide slot 941 is formed on the compartment side of the rotation hole 940. The slide protrusion 812 is inserted in the first slide slot 941. That is, the vertically rotating arm 94 and the vertically rotating member 81 are connected to each other through the first slide slot 941 and the slide protrusion 812. A second slide slot 942 is further formed on the compartment side of the first slide slot 941.

The horizontal fin connection rod 95 is made of a resin and shaped like a slender plate. The horizontal fin connection rod 95 is disposed on a side of the vertically rotating arm 94. Five drive piece connection holes 950 in total are formed in the horizontal fin connection rod 95.

Each of the horizontal fin drive pieces 96 is made of a resin and shaped like a small piece of slender plate. The horizontal fin drive pieces 96 are provided as five pieces in total on a side of the horizontal fin connection rod 95. Rod connection shafts 960 are provided so as to protrude from the horizontal fin drive pieces 96 respectively. The rod connection shafts 960 are inserted in the drive piece connection holes 950 respectively. That is, the horizontal fin drive pieces 96 are connected to the horizontal fin connection rod 95 through the rod connection shafts 960 and the drive piece connection holes 950. A slide shaft 961 is provided so as to be protrude from a car exterior-side end of the center one of the five horizontal fin drive pieces 96. The slide shaft 961 is inserted in the second slide slot 942. That is, the horizontal fin drive pieces 96 are connected to the vertically rotating arm 94 through the slide shaft 961 and the second slide slot 942. The horizontal fin rotation shafts 50 of the horizontal fins 5 are inserted and fixed into the horizontal fin drive pieces 96 respectively. Thus, the horizontal fin drive pieces 96 are connected to the horizontal fins 5 respectively. In this manner, the common operation stick 7 is connected to the horizontal fins 5.

Figure 4:
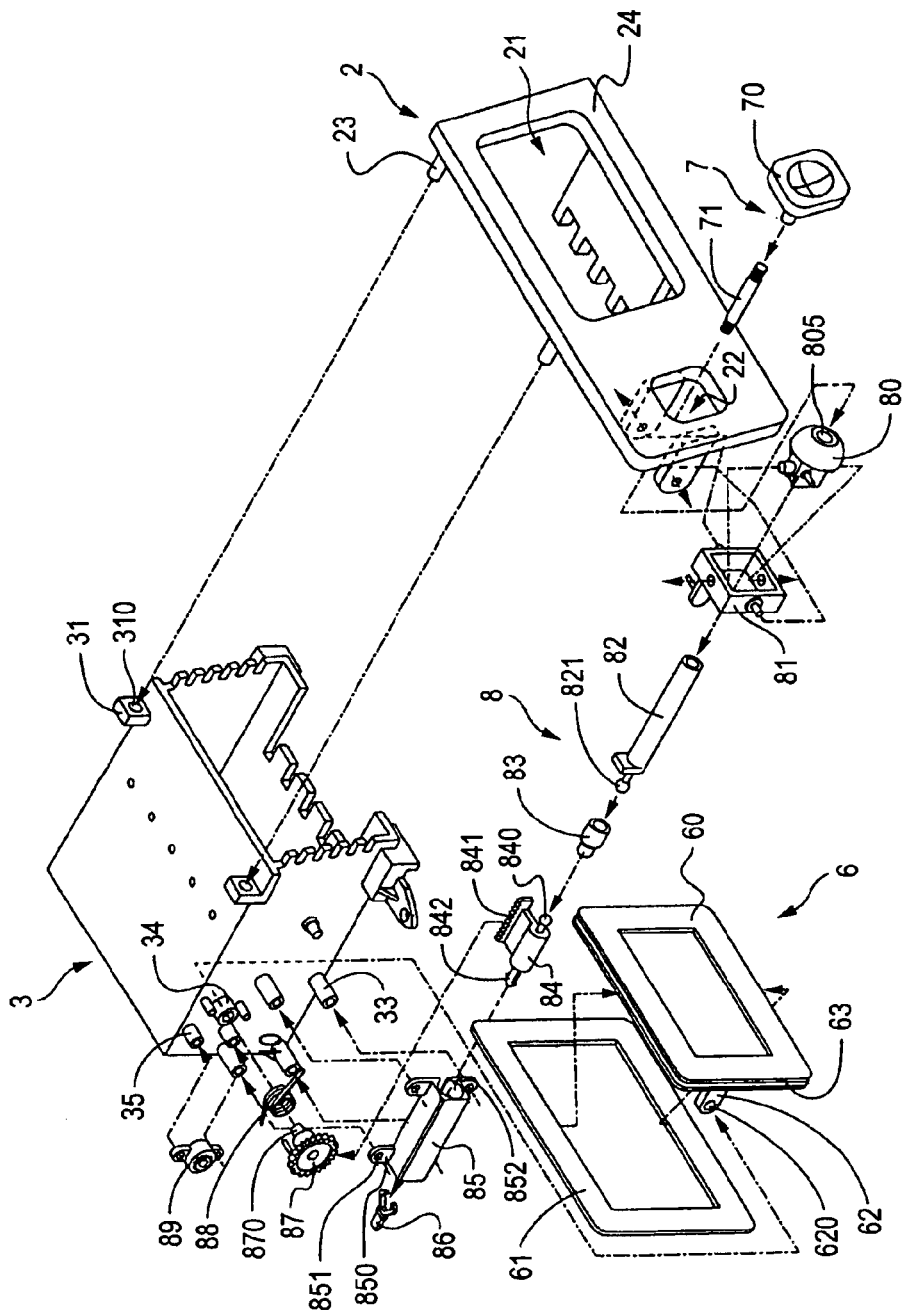
FIG. 4 is an exploded view showing a mechanism of connection between the common operation stick and the open/close damper.

Next, the mechanism of connection between the common operation stick 7 and the open/close damper 6 will be described. FIG. 4 is an exploded view showing the mechanism of connection between the common operation stick and the open/close damper. Incidentally, members having no relation to the connection between the common operation stick and the open/close damper are not shown in FIG. 4.

The stick body 71 is inserted in the stick through-hole 805 of the horizontally rotating member 80. The first shaft 82 is made of a resin and shaped like a cylinder. A car exterior-side end of the stick body 71 is thread-engaged with the compartment-side end of the first shaft 82. A first ball joint 821 is integrally formed at the car exterior-side end of the first shaft 82.

The shaft connection pipe 83 is made of a resin and shaped like an axially short cylinder. The first ball joint 821 is inserted in the compartment-side end of the shaft connection pipe 83. Thus, the shaft connection pipe 83 and the first shaft 82 are connected to each other.

The second shaft 84 is made of a resin and shaped like a round rod. The second shaft 84 is disposed on the car exterior side of the shaft connection pipe 83. A second ball joint 840 is integrally formed at the compartment-side end of the second shaft 84. The second ball joint 840 is inserted in the car exterior-side end of the shaft connection pipe 83. Thus, the second shaft 84 and the shaft connection pipe 83 are connected to each other. A rack 841 is integrally formed on a side of the second shaft 84. An arrowhead-shaped engagement protrusion 842 is integrally formed at the car exterior-side end of the second shaft 84.

The casing 85 is made of a resin and shaped like a rectangular pipe. The casing 85 is disposed on the car exterior side of the second shaft 84. The second shaft 84 can be received in the inside of the casing 85. A taper surface 852 is formed at an opening end of the casing 85. Accordingly, the opening end is formed so as to be slightly wide-mouthed. Four small piece-shaped casing mount seats 850 in total are disposed on the outer surface of the casing 85. Casing mount holes 851 are formed in the casing mount seats 850 respectively. Screws (not shown) are thread-engaged with the casing mount bosses 33 through the casing mount holes 851 respectively to thereby fix the casing 85 to the retainer 3.

The second shaft bearing 86 is made of a resin and shaped like a small piece of slender plate forked into two compartment-side ends. The second shaft bearing 86 is disposed on the car exterior side of the casing 85. The engagement protrusion 842 is locked to the compartment-side end of the second shaft bearing 86. Thus, the second shaft 84 is locked to the second shaft bearing 86.

The pinion 87 is made of a resin. The pinion 87 is disposed between the casing 85 and the retainer 3. A rotation shaft 870 is provided so as to protrude from the center of the pinion 87. The rotation shaft 870 is inserted in the pinion mount boss 34. The rotation shaft 870 is inserted and fixed into the damper rotation hole 620. That is, the pinion 87 and the open/close damper 6 are connected to each other through the rotation shaft 870 and the damper rotation hole 620. The pinion mount boss 34 is wound with the metal coiled spring 88. The pinion 87 is engaged with the rack 841. Thus, the pinion 87 and the second shaft 84 are connected to each other.

The oil damper 89 is thread-engaged with the oil damper mount bosses 35. The oil damper 89 is engaged with the pinion 87. In this manner, the common operation stick 7 and the open/close damper 6 are connected to each other.

Figure 5:
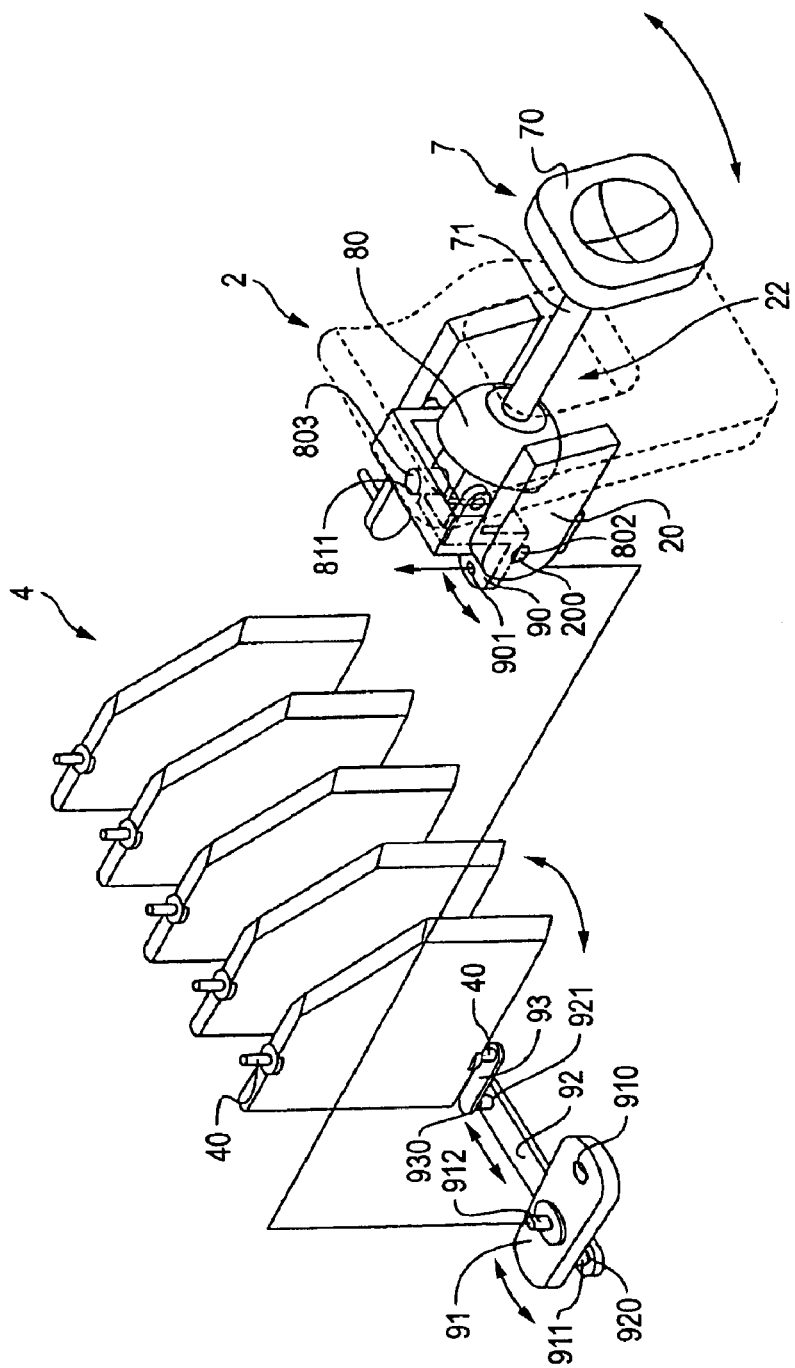
FIG. 5 is a perspective view showing the action of the air-conditioning register at the time of operating the vertical fin unit.

Next, the action of the air-conditioning register according to this embodiment will be described. First, the action of the air-conditioning register 1 at the time of operating the vertical fin unit 4 will be described. FIG. 5 shows the action of the air-conditioning register at the time of operating the vertical fin unit. When a passenger moves the front end portion 70 of the common operation stick 7 left/right, the horizontally rotating member 80 and the horizontal rotation connection member 90 first swing left/right around the rotation shaft 803. Then, the horizontally rotating arm 91 connected to the arm connection hole 901 of the horizontal rotation connection member 90 swings left/right around the rotation hole 910. Then, the vertical fin connection rod 92 connected to the rod connection shaft 911 of the horizontally rotating arm 91 makes reciprocating motion (moves left/right). Then, the vertical fin drive pieces 93 connected to the drive piece connection holes 921 of the vertical fin connection rod 92 swing left/right around the vertical fin rotation shafts 40 respectively. As well as the vertical fin drive pieces 93, the vertical fins 4 fixed to the vertical fin drive pieces 93 swing left/right around the vertical fin rotation shafts 40 respectively. In this manner, the passenger can operate the vertical fins 4.

Figure 6:
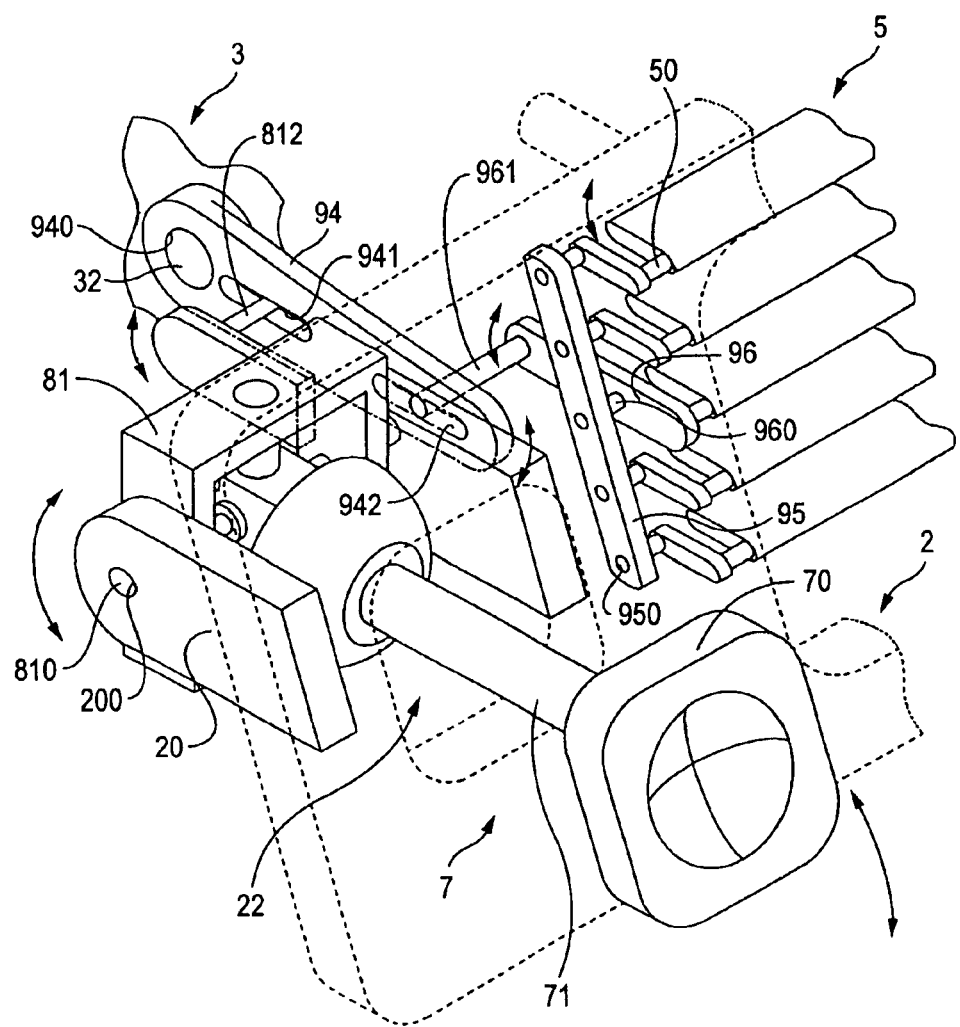
FIG. 6 is a perspective view showing the action of the air-conditioning register at the time of operating the horizontal fin unit.

Next, the action of the air-conditioning register 1 at the time of operating the horizontal fin unit 5 will be described. FIG. 6 shows the action of the air-conditioning register at the time of operating the horizontal fin unit. When a passenger moves the front end portion 70 of the common operation stick 7 up/down, the vertically rotating member 81 first swings up/down around the rotation shaft 810. Then, the vertically rotating arm 94 connected to the slide protrusion 812 of the vertically rotating member 81 swings up/down around the arm shaft 32. Then, the horizontal fin drive piece 96 connected to the second slide slot 942 of the vertically rotating arm 94 swings up/down around the corresponding horizontal fin rotation shaft 50. As well as the horizontal fin drive piece 96, the horizontal fins 5 connected through the horizontal fin connection rod 95 swing up/down around the horizontal fin rotation shafts 50 respectively. In this manner, the passenger can operate the horizontal fins 5. Incidentally, the vertical fin unit 4 and the horizontal fin unit 5 can be operated simultaneously when the front end portion 70 of the common operation stick 7 is moved obliquely. When the front end portion 70 is moved obliquely, the actions shown in FIGS. 5 and 6 are performed simultaneously so that the vertical fin unit 4 and the horizontal fin unit 5 can be operated simultaneously.

Figure 7:
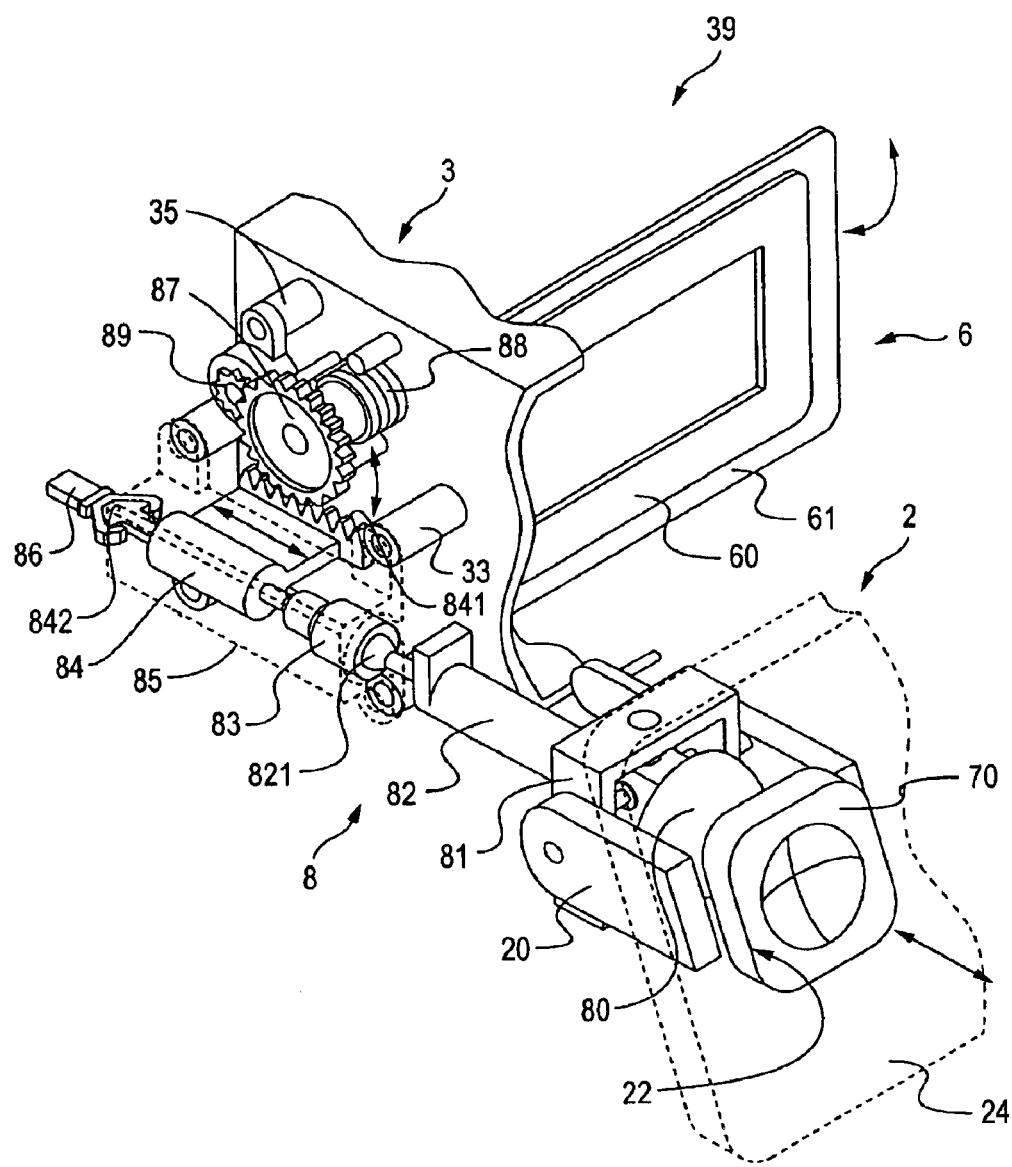
FIG. 7 is a perspective view showing the action of the air-conditioning register at the time of operating the open/close damper.

Next, the action of the air-conditioning register 1 at the time of operating the open/close damper 6 will be described. FIG. 7 shows the action of the air-conditioning register at the time of operating (closing) the open/close damper. When a passenger pushes the front end portion 70 of the common operation stick 7 toward the car exterior, that is, toward the panel body 24, the first shaft 82, the shaft connection pipe 83 and the second shaft 84 first move toward the car exterior. Then, the pinion 87 rotates on the basis of the engagement of the pinion 87 with the rack 841. Then, the open/close damper 6 fixed to the rotation shaft of the pinion 87 swings in the retainer 3. The engagement protrusion 842 is locked to the second shaft bearing 86. At the same time, the open/close damper 6 closes the air passage 39. The front end portion 70 is kept substantially flush with the front surface of the panel body 24.

When the passenger further pushes the front end portion 70 of the common operation stick 7 toward the panel body 24, the pinion 87 first rotates in a direction reverse to the aforementioned direction on the basis of the urging force of the spring 88. Then, the common operation stick 7 protrudes toward the compartment. On this occasion, the pinion 87 is engaged with the oil damper 89. Accordingly, the pinion 87 protrudes relatively slowly.

Next, the effect of the air-conditioning register according to this embodiment will be described. In the air-conditioning register 1 according to this embodiment, the open/close damper 6 as well as the vertical fin unit 4 and the horizontal fin unit 5 can be operated by the common operation stick 7. It is therefore unnecessary to separately dispose any operation portion for exclusive use of the open/close damper 6. Accordingly, the number of parts required for the air-conditioning register 1 according to this embodiment can be reduced. Furthermore, the air-conditioning register 1 according to this embodiment is simple in structure. In addition, the cost for production of the air-conditioning register 1 according to this embodiment is low.

Furthermore, in the air-conditioning register 1 according to this embodiment, the common operation stick 7 is disposed in the outside of the opening 21. Accordingly, there is no fear that the flow of conditioned air may be disturbed by the common operation stick 7. Accordingly, the air-conditioning register 1 according to this embodiment is low in air resistance. In addition, the air-conditioning register 1 according to this embodiment is low in pressure loss.

Furthermore, in the air-conditioning register 1 according to this embodiment, the common operation stick 7 is disposed as a common operation portion. The common operation stick 7 protrudes from the register panel 2 to thereby open the open/close damper 6. The common operation stick 7 gets into the register panel 2 from the protrusive position to thereby close the open/close damper 6. The common operation stick 7 moves up/down at the protrusive position to thereby move the horizontal fins 5 up/down. The common operation stick 7 moves left/right at the protrusive position to thereby move the vertical fins 4 left/right.

As described above, in the air-conditioning register 1 according to this embodiment, the operating direction linked to the open/close damper 6 clearly differs from the operating direction linked to the vertical fins 4 or horizontal fins 5. Accordingly, even in the case where the passenger is driving the car, the operation of the open/close damper 6 and the operation of the vertical fins 4 or horizontal fins 5 can be easily distinguished from each other by only the operating feeling. That is, the air-conditioning register 1 according to this embodiment is excellent in handling property.

Moreover, in the air-conditioning register 1 according to this embodiment, the front end portion of the common operation stick 7 is disposed substantially flush with the register panel 2 when the common operation stick 7 is inserted in the register panel 2. Accordingly, there can be obtained a high degree of uniformity in design of the front end portion 70 of the common operation stick 7 with the register panel 2.

Moreover, in the air-conditioning register 1 according to this embodiment, the taper surface 852 is formed at the opening end of the casing 85. Accordingly, the common operation stick 7 can be pushed easily even in the case where the second shaft 84 is inclined to the pushing direction, in other words, even in the case where the common operation stick 7 is inclined to the pushing direction. Accordingly, the air-conditioning register 1 according to this embodiment is excellent in handling property of the open/close damper 6.

Moreover, in the air-conditioning register 1 according to this embodiment, it is unnecessary to use any expensive ball joint for operating the vertical fin unit 4 and the horizontal fin unit 5 simultaneously. Accordingly, the cost for production of the air-conditioning register 1 is relatively low.

(2) Second Embodiment

This embodiment differs from the first embodiment in that a swinging stick is disposed instead of the common operation stick.

Figure 8:
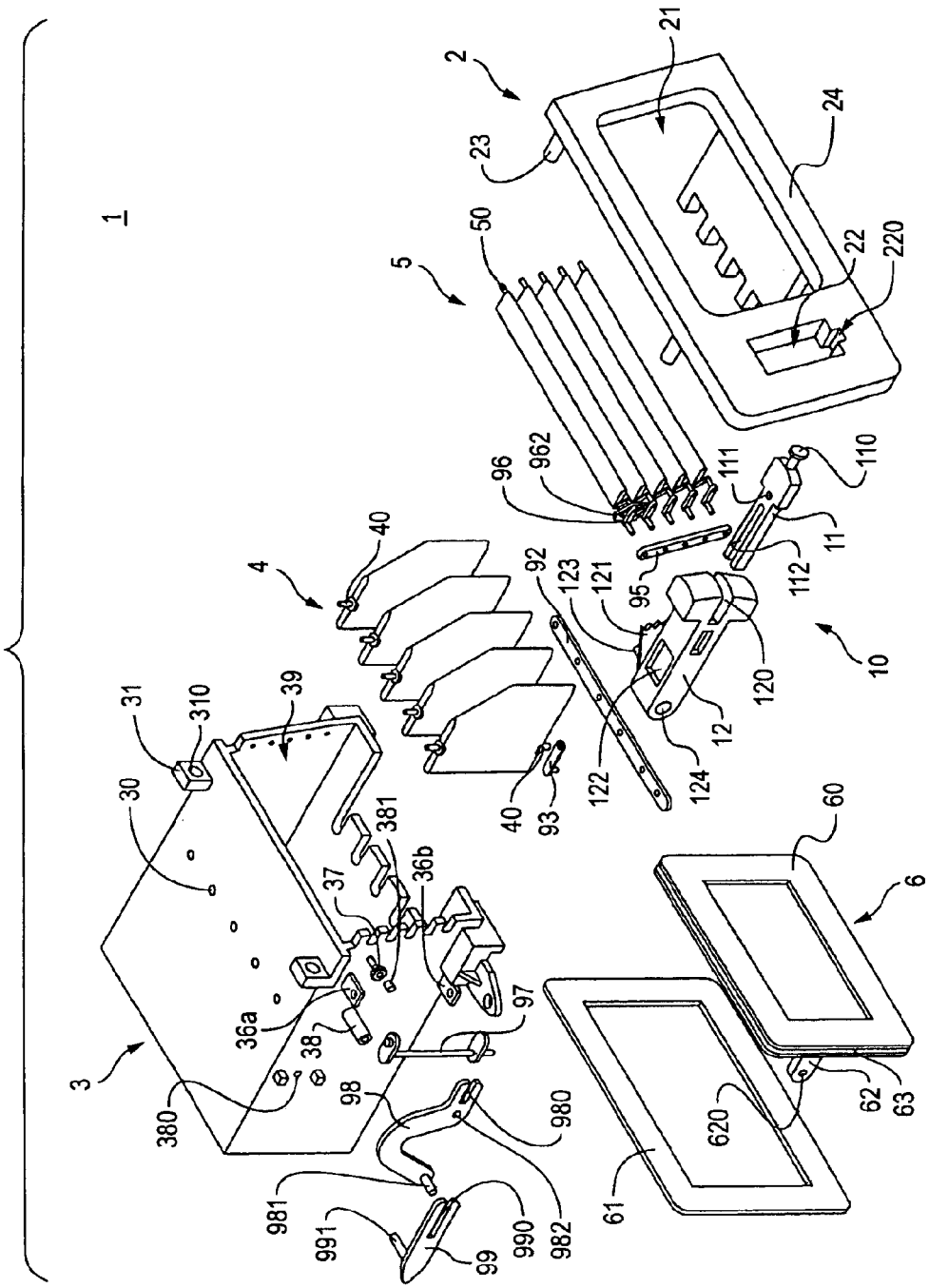
FIG. 8 is an exploded view of an air-conditioning register according to a second embodiment of the invention.

First, the configuration of the air-conditioning register according to this embodiment will be described. FIG. 8 is an exploded view showing the air-conditioning register according to this embodiment. Incidentally, parts corresponding to those in FIG. 1 are referred to by numerals the same as those in FIG. 1. The swinging stick 10 includes a horizontally swinging portion 11, and a vertically swinging portion 12. The swinging stick 10 is included in the swinging operation portion in the invention. Further, the swinging stick 10 is included in the fin operation device in the invention. The horizontally swinging portion 11 is included in the vertical fin drive portion in the invention. The vertically swinging portion 12 is included in the horizontal fin drive portion in the invention.

A compartment-side end of the swinging stick 10 is revealed on the compartment side from the operation port 22. A stick swinging shaft 38, rod support pieces 36a and 36b and a first arm swinging shaft 381 are provided so as to protrude from an outer surface of a side wall of the retainer 3. A second arm swinging hole 380 is formed in the side wall of the retainer 3. A pinion 37 is rotatably disposed on the outer surface of the side wall of the retainer 3. A first arm 98 made of a resin and curved like a "C" figure is disposed on the first arm swinging shaft 381 so that the first arm 98 can swing freely. A second arm 99 made of a resin and shaped like a strip of fancy paper is disposed in the second arm swinging hole 380 so that the second arm 99 can swing freely.

Figure 9:
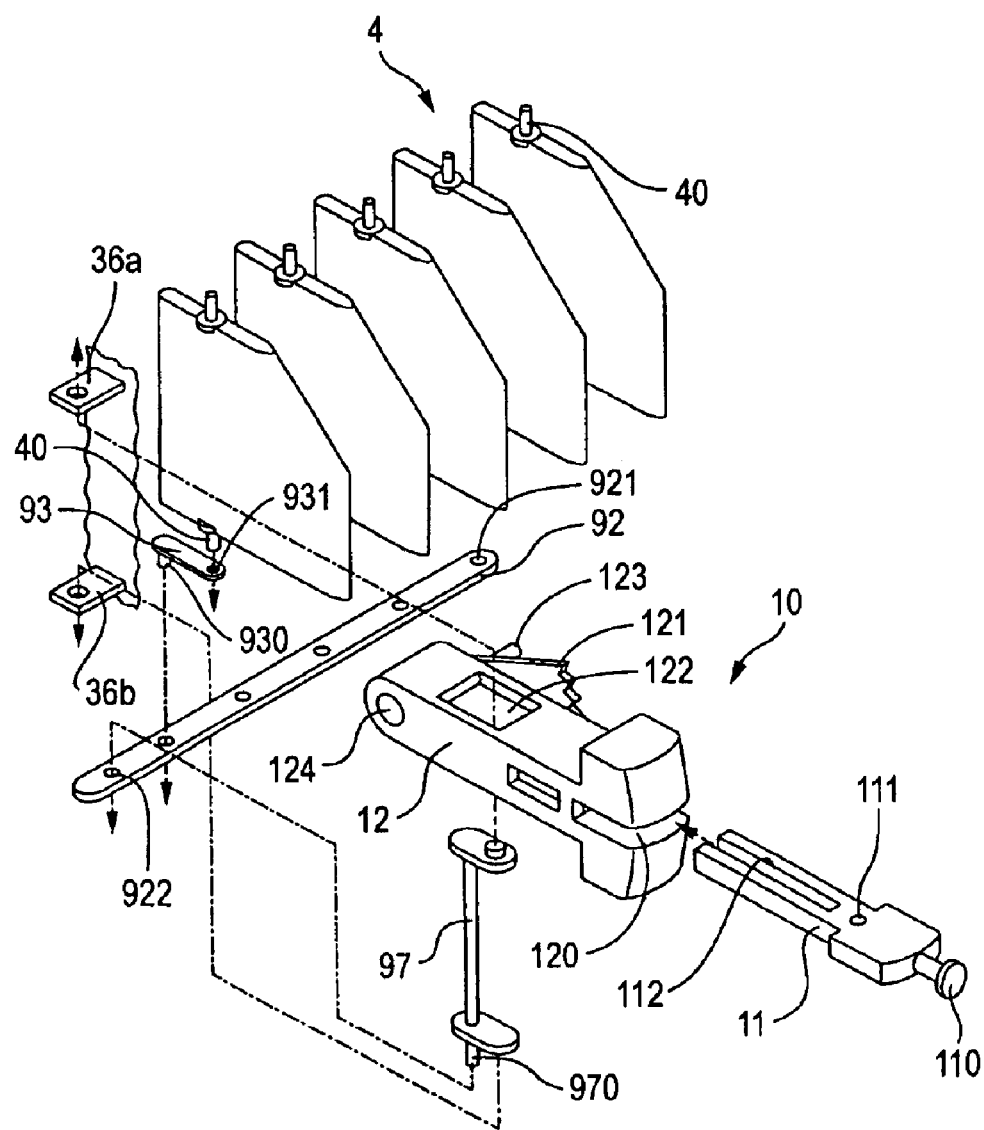
FIG. 9 is an exploded view showing a mechanism of connection between the swinging stick and the vertical fin unit.

Next, the mechanism of connection between the swinging stick 10 and the vertical fin unit 4 will be described in detail. FIG. 9 is an exploded view showing the mechanism of connection between the swinging stick and the vertical fin unit. Incidentally, members having no relation to the connection between the swinging stick and the vertical fin unit are not shown in FIG. 9.

As shown in FIG. 9, the horizontally swinging portion 11 of the swinging stick 10 is made of a resin and shaped like a strip of fancy paper. A nailhead-shaped front end portion 110 is provided at the compartment-side end of the horizontally swinging portion 11 so as to protrude therefrom. On the other hand, a swinging groove 112 extending from the compartment side to the car exterior side is formed at the car exterior-side end of the horizontally swinging portion 11. A swinging hole 111 is formed between the front end portion 110 and the swinging groove 112.

The vertically swinging portion 12 is made of a resin and shaped like a T-shaped pipe. The compartment-side end of the vertically swinging portion 12 extends vertically. A horizontally swinging portion-receiving port 120 is formed at the compartment-side end of the vertically swinging portion 12. The horizontally swinging portion 11 is received in the vertically swinging portion 12 in the condition that the front end portion 110 protrudes from the horizontally swinging portion-receiving port 120. The horizontally swinging portion 11 is pivotally supported into the vertically swinging portion 12 through the swinging hole 111. That is, the horizontally swinging portion 11 can swing horizontally around the swinging hole 111. A rod through-hole 122 shaped like a rectangle is formed so as to pierce upper and lower walls of the vertically swinging portion 12. A swinging rod 97 shaped like a round rod passes through the rod through-hole 122. The swinging rod 97 is disposed in the swinging groove 112 in the vertically swinging portion 12. Upper and lower ends of the swinging rod 97 are pivoted on rod support pieces 36a and 36b respectively. A connection protrusion 970 is provided at a lower end of the swinging rod 97 so as to protrude therefrom. The connection protrusion 970 is inserted in a connection hole 922 of a vertical fin connection rod 92. Rod connection shafts 930 of vertical fin drive pieces 93 are also inserted in the vertical fin connection rod 92. The vertical fin rotation shafts 40 of the vertical fins 4 are inserted in fin rotation holes 931 of the vertical fin drive pieces 93 respectively. That is, the swinging rod 97 and the vertical fin unit 4 are connected to each other through the vertical fin connection rod 92 and the vertical fin drive pieces 93. In this manner, the swinging stick 10 and the vertical fin unit 4 are connected to each other.

Figure 10:
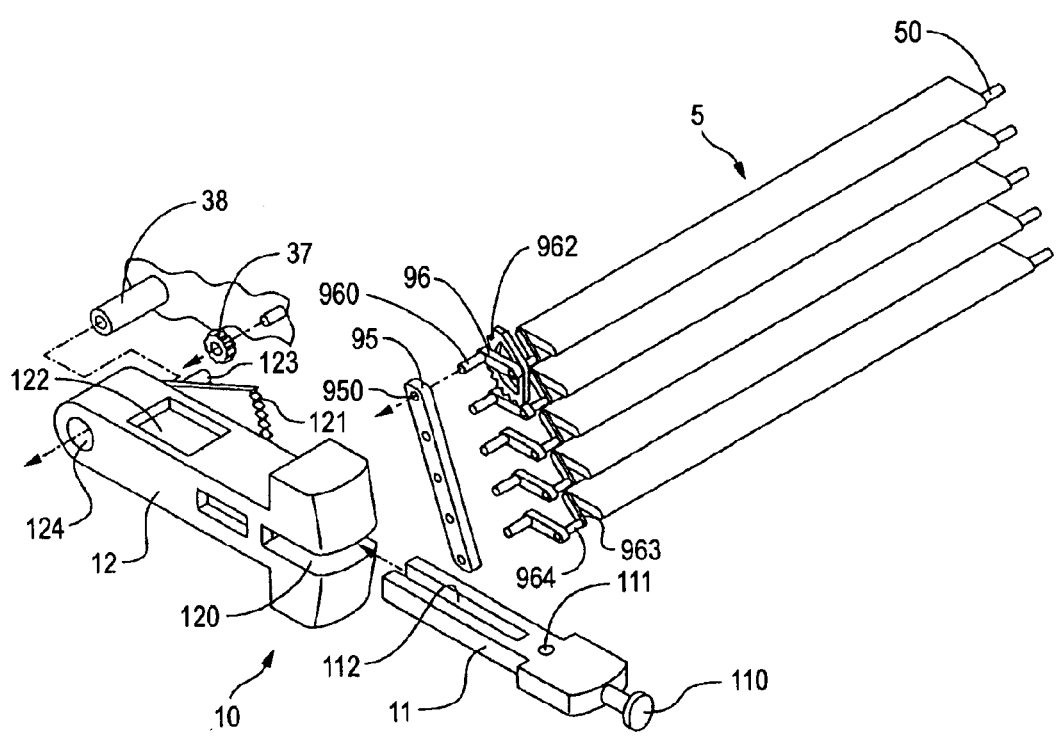
FIG. 10 is an exploded view showing a mechanism of connection between the swinging stick and the horizontal fin unit.

Next, the mechanism of connection between the swinging stick 10 and the horizontal fin unit 5 will be described in detail. FIG. 10 is an exploded view showing the mechanism of connection between the swinging stick and the horizontal fin unit. Incidentally, members having no relation to the connection between the swinging stick and the horizontal fin unit are not shown in FIG. 10.

The mechanism of connection between the horizontally and vertically swinging portions 11 and 12 for forming the swinging stick 10 has been already described and the description thereof will be omitted here. A stick swinging hole 124 is formed at the car exterior-side end of the vertically swinging portion 12. A stick swinging shaft 38 is inserted in the stick swinging hole 124. That is, the swinging stick 10 can swing vertically around the stick swinging shaft 38. A stick-side gear 121 shaped like a sector is disposed on an outer surface of a side wall of the vertically swinging portion 12. The stick-side gear 121 is engaged with the pinion 37.

On the other hand, an L-shaped auxiliary drive piece 963 is fixed to an end of each horizontal fin 5 in the car width direction. A drive piece-side gear 962 shaped like a sector is fixed to the drive piece connection shaft 964 of the auxiliary drive piece 963 of the uppermost disposed horizontal fin 5. The drive piece-side gear 962 is engaged with the pinion 37. That is, the stick-side gear 121 and the drive piece-side gear 962 are connected to each other through the pinion 37. The horizontal fin drive pieces 96 are also fixed to the drive piece connection shafts 964 respectively. Rod connection shafts 960 of the horizontal fin drive pieces 96 are inserted in the drive piece connection holes 950 of the horizontal fin connection rod 95 respectively. That is, the five horizontal fins 5 are connected to one another through the auxiliary drive pieces 963, the horizontal fin drive pieces 96 and the horizontal fin connection rod 95. The auxiliary drive piece 963 of the uppermost horizontal fin 5 and the swinging stick 10 are connected to each other through the stick-side gear 121, the pinion 37 and the drive piece-side gear 962. In this manner, the swinging stick 10 and the horizontal fin unit 5 are connected to each other.

Figure 11:
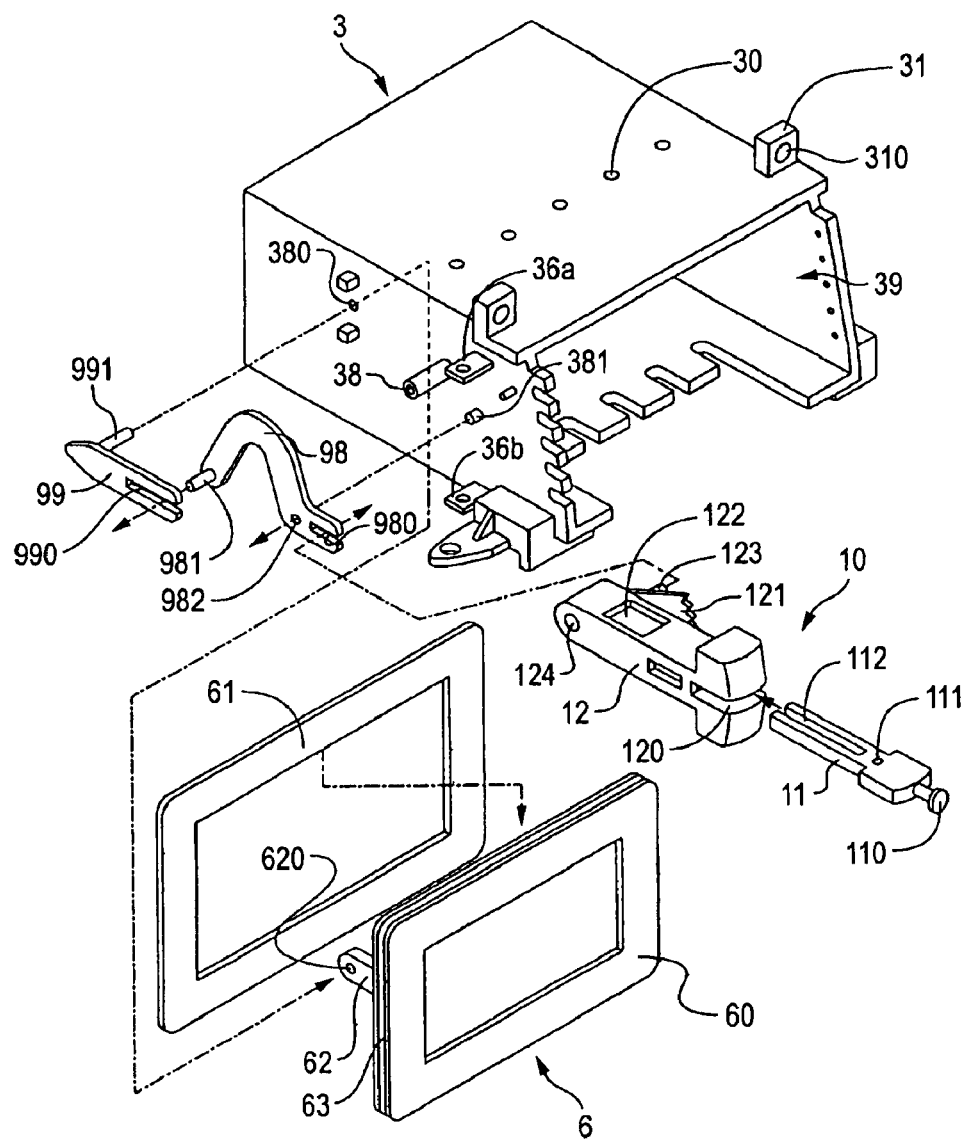
FIG. 11 is an exploded view showing a mechanism of connection between the swinging stick and the open/close damper.

Next, the mechanism of connection between the swinging stick 10 and the open/close damper 6 will be described in detail. FIG. 11 is an exploded view showing the mechanism of connection between the swinging stick and the open/close damper. Incidentally, members having no relation to the connection between the swinging stick and the open/close damper are not shown in FIG. 11.

The mechanism of connection between the horizontally and vertically swinging portions 11 and 12 for forming the swinging stick 10 has been already described and the description thereof will be omitted here. A stick-side protrusion 123 is provided so as to protrude from the outer surface of the side wall of the vertically swinging portion 12. On the other hand, a first interlocking groove 980 is formed at the compartment-side end of the first arm 98. The stick-side protrusion 123 is inserted in the first interlocking groove 980. A first arm swinging hole 982 is formed on the car exterior side of the first interlocking groove 980. A first arm swinging shaft 381 is inserted in the first arm swinging hole 982. That is, the first arm 98 can swing around the first arm swinging shaft 381.

A first interlocking protrusion 981 is provided at the car exterior-side end of the first arm 98 so as to protrude therefrom. On the other hand, a second interlocking groove 990 is formed at the compartment-side end of the second arm 99. The first interlocking protrusion 981 is inserted in the second interlocking groove 990. A second arm swinging shaft 991 is provided on the car exterior side of the second interlocking groove 990 so as to protrude toward the retainer 3. The second arm swinging shaft 991 is inserted in the second arm swinging hole 380. That is, the second arm 99 can swing around the second arm swinging shaft 991. The second arm swinging shaft 991 is fixed to the damper rotation hole 620 in the retainer 3. In this manner, the swinging stick 10 and the open/close damper 6 are connected to each other.

Figure 12:
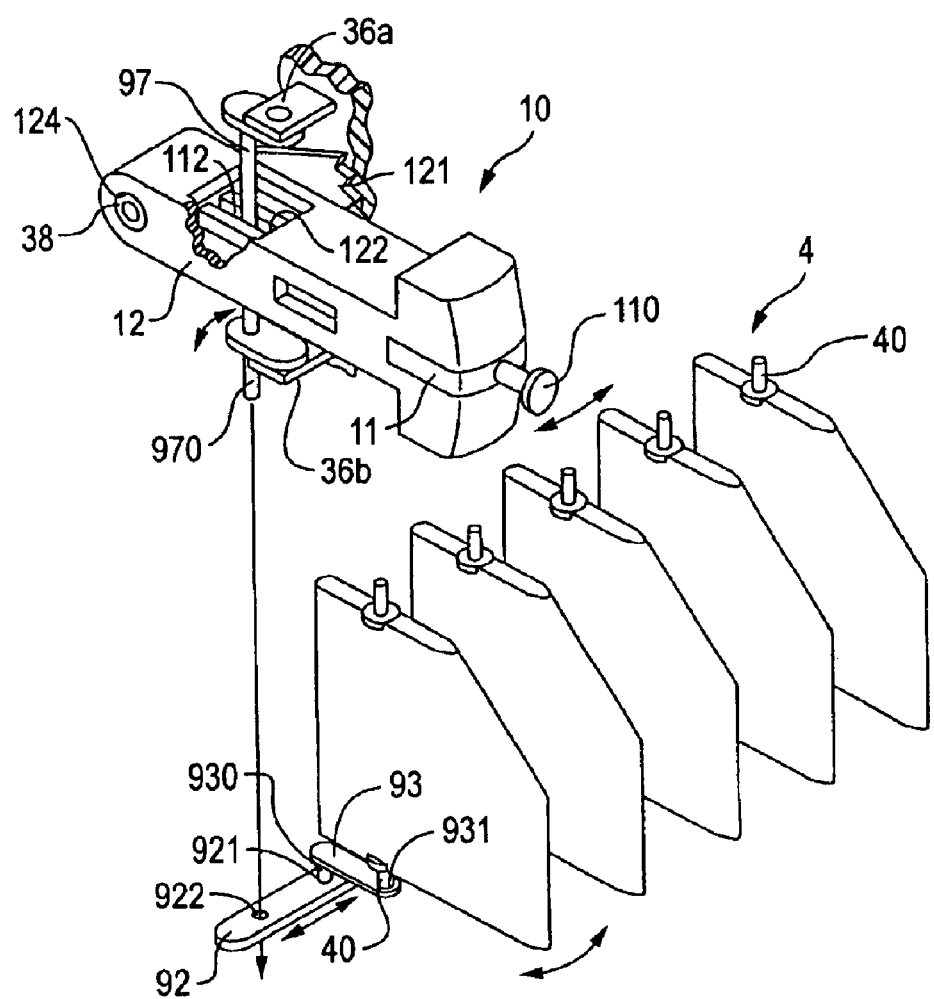
FIG. 12 is a perspective view showing the action of the air-conditioning register at the time of operating the vertical fin unit.

Next, the action of the air-conditioning register according to this embodiment will be described. First, the action of the air-conditioning register at the time of operating the vertical fin unit will be described. FIG. 12 shows the action of the air-conditioning register at the time of operating the vertical fin unit. When a passenger moves the front end portion 110 of the swinging stick 10 left/right, the horizontally swinging portion 11 first swings left/right around the swinging hole 111 shown in FIG. 9. Then, the swinging rod 97 inserted in the swinging groove 112 swings left/right. Then, the vertical fin connection rod 92 in which the connection protrusion 970 of the swinging rod 97 is inserted makes reciprocating motion (moves left/right). Then, the vertical fin drive pieces 93 connected to the drive piece connection holes 921 of the vertical fin connection rod 92 swing left/right around the vertical fin rotation shafts 40 respectively. Accordingly, as well as the vertical fin drive pieces 93, the vertical fins 4 fixed to the vertical fin drive pieces 93 swing left/right around the vertical fin rotation shafts 40 respectively. In this manner, the passenger can operate the vertical fins 4.

Figure 13:
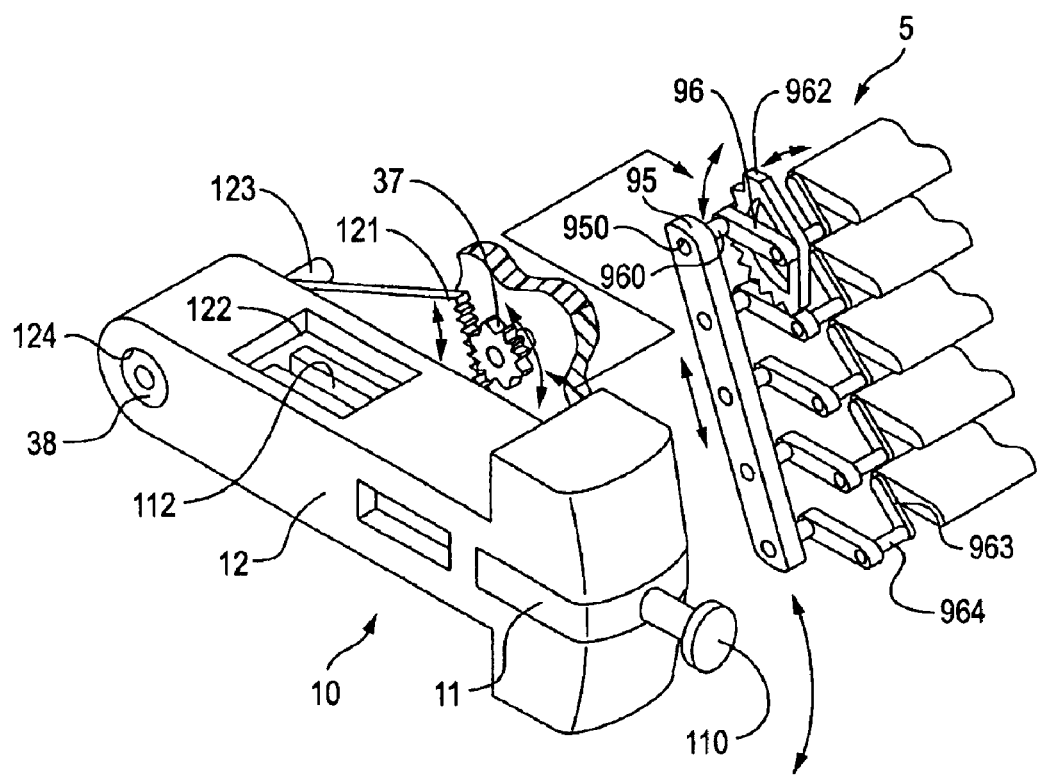
FIG. 13 is a perspective view showing the action of the air-conditioning register at the time of operating the horizontal fin unit.

Next, the action of the air-conditioning register at the time of operating the horizontal fin unit will be described. FIG. 13 shows the action of the air-conditioning register at the time of operating the horizontal fin unit. When a passenger moves the front end portion 110 of the swinging stick 10 up/down, the vertically swinging portion 12 first swings up/down around the stick swinging shaft 38. Then, the stick-side gear 121 fixed to the vertically swinging portion 12 swings up/down. Then, the pinion 37 engaged with the stick-side gear 121 rotates. Then, the drive piece-side gear 962 engaged with the pinion 37 swings up/down around the drive piece connection shaft 964 of the uppermost horizontal fin 5. On this occasion, the drive piece-side gear 962 is fixed to the drive piece connection shaft 964. Accordingly, the auxiliary drive piece 963 of the uppermost horizontal fin 5 swings up/down around the drive piece connection shaft 964. When the auxiliary drive piece 963 swings up/down, the uppermost horizontal fin 5 swings up/down around the drive piece connection shaft 964.

When the auxiliary drive piece 963 of the uppermost horizontal fin 5 swings up/down, the horizontal fin drive piece 96 swings up/down around the drive piece connection shaft 964. The up/down swinging is transmitted to the horizontal fin drive pieces 96 of the other horizontal fins 5 through the up/down reciprocating motion of the horizontal fin connection rod 95. The up/down swinging is transmitted to the other horizontal fins 5 through the auxiliary drive pieces 963. In this manner, the passenger can operate all the horizontal fins 5. Incidentally, the vertical fin unit 4 and the horizontal fin unit 5 can be operated simultaneously when the front end portion 110 of the swinging stick 10 is moved obliquely. When the front end portion 110 is moved obliquely, the actions shown in FIGS. 12 and 13 are performed simultaneously so that the vertical fin unit 4 and the horizontal fin unit 5 can be operated simultaneously.

Figure 14:
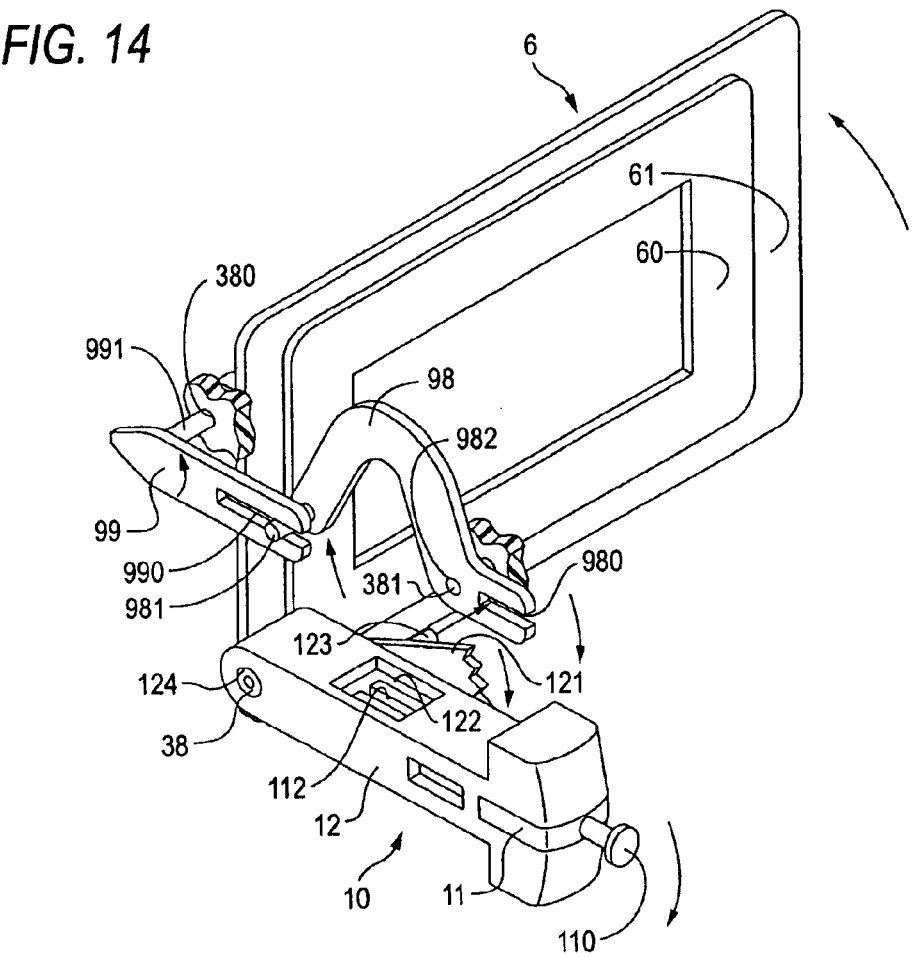
FIG. 14 is a perspective view showing the action of the air-conditioning register at the time of operating the open/close damper.
Figure 15:
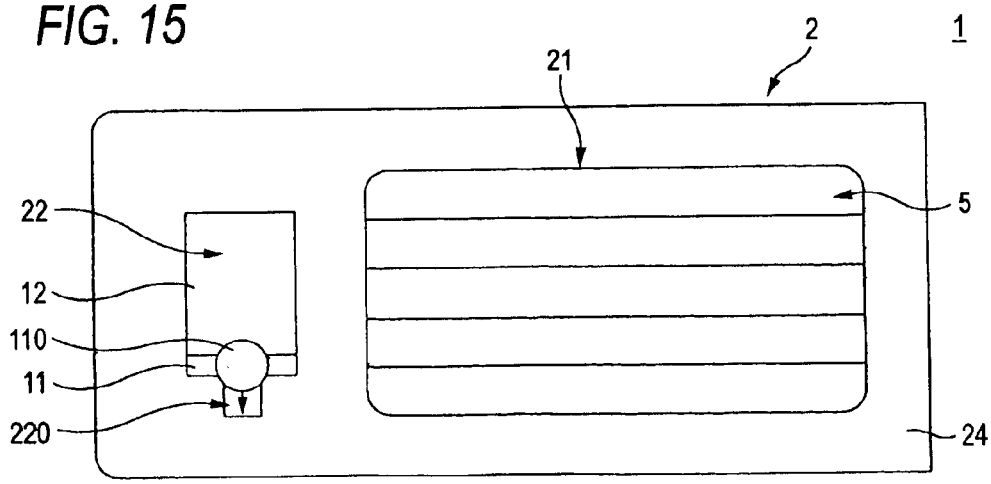
FIG. 15 is a front view showing a state in which the horizontal fin unit is swung down to the maximum swinging position.

Next, the action of the air-conditioning register at the time of operating the open/close damper will be described. FIG. 14 shows the action of the air-conditioning register at the time of operating the open/close damper. FIG. 15 is a front view showing a state in which the horizontal fins are swung down to maximum swinging positions. When the swinging stick 10 is further swung down from the state shown in FIG. 15, the swinging stick 10 enters the damper operating port 220 so that the open/close damper 6 can be operated (closed).

Specifically, when a passenger further swings down the swinging stick 10 from the state shown in FIG. 15, the vertically swinging portion 12 shown in FIG. 14 first swings down around the stick swinging shaft 38. Then, the stick-side protrusion 123 fixed to the vertically swinging portion 12 swings down. Then, the first arm 98 engaged with the stick-side protrusion 123 swings clockwise around the first arm swinging shaft 381. Then, the second arm 99 engaged with the first interlocking protrusion 981 of the first arm 98 swings counterclockwise around the second arm swinging shaft 991. On this occasion, the swinging of the second arm 99 is limited by a spring (not shown) That is, the second arm 99 is provided so as not to swing unless load exceeding the urging force of the spring is applied to the second arm 99. When the second arm swinging shaft 991 rotates, the open/close damper 6 in the retainer rotates. In this manner, the passenger can operate (close) the open/close damper 6.

Next, the effect of the air-conditioning register according to this embodiment will be described. In the air-conditioning register 1 according to this embodiment, the vertical fin unit 4, the horizontal fin unit 5 and the open/close damper 6 can be operated simply when one swinging stick 10 is swung. Accordingly, the air-conditioning register 1 is excellent in handling property.

Moreover, in the air-conditioning register 1 according to this embodiment, the motion of the horizontal fin unit 5 is interlocked with the motion of the open/close damper 6. Accordingly, when the passenger visually recognizes that the horizontal fin unit 5 is located in the maximum swinging position as shown in FIG. 15, the passenger can recognize that the open/close damper 6 is closed. Accordingly, the state of the open/close damper 6 which cannot be visually recognized from the compartment can be recognized indirectly.

Furthermore, as shown in FIG. 13, the horizontal fins 5 are connected to the horizontal fin connection rod 95 through the horizontal fin drive pieces 96 and the auxiliary drive pieces 963. For this reason, if the air passage is to be fully closed by the horizontal fins 5, the horizontal fins 5 swing around the drive piece connection shafts 964 so as to protrude toward the compartment. Accordingly, as shown in FIG. 15, in the state in which the air passage is fully closed, the five horizontal fins 5 are disposed substantially flush with the panel body 24. Hence, the air-conditioning register 1 according to this embodiment is excellent in design.

Furthermore, the distance from the stick swinging hole 124 to the front end portion 110 in the swinging stick 10, that is, the swinging radius of the swinging stick 10 is selected to be relatively large. For this reason, in the air-conditioning register 1 according to this embodiment, the quantity of protrusion of the front end portion 110 at the time of operating the swinging stick 10 is small. Accordingly, the swinging stick 10 can be handled with good feeling at the time of operating the swinging stick 10.

(3) Third Embodiment

This embodiment differs from the second embodiment in that a fin operation device is disposed instead of the swinging stick while the fin operation device and the open/close damper are not connected to each other.

Figure 16:
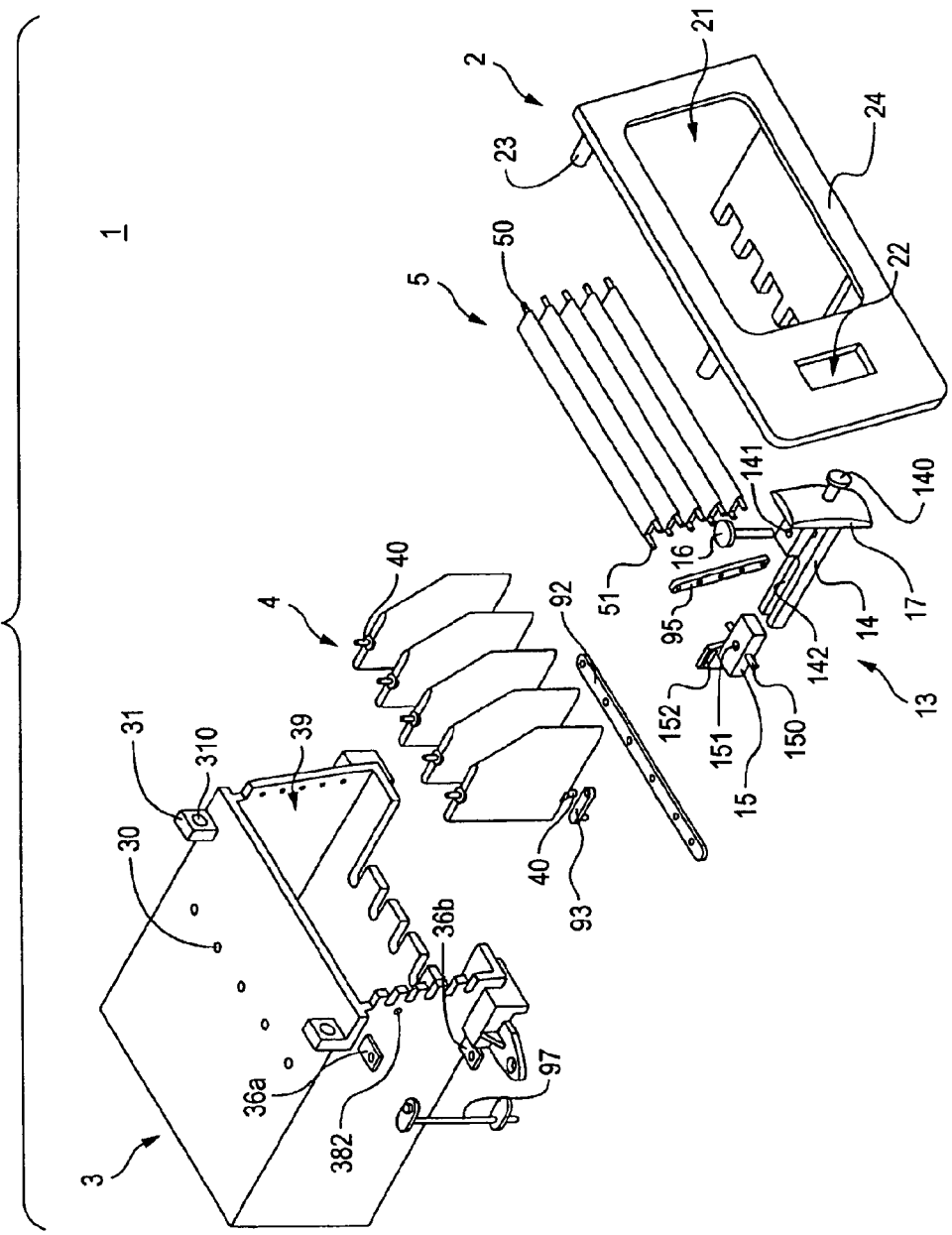
FIG. 16 is an exploded view of an air-conditioning register according to a third embodiment of the invention.

First, the configuration of the air-conditioning register according to this embodiment will be described. FIG. 16 is an exploded view showing the air-conditioning register according to this embodiment. Incidentally, parts corresponding to those in FIGS. 1 and 8 are referred to by numerals the same as those in FIGS. 1 and 8. The open/close damper is not shown in FIG. 16. The fin operation device 13 includes a vertical fin drive portion 14, a horizontal fin drive portion 15, and a panel portion 17.

A front surface of the panel portion 17 is revealed on the compartment side from the operation port 22. A horizontal fin drive portion-rotating hole 382 is formed in an outer surface of a side wall of the retainer 3. Rod support pieces 36a and 36b are provided so as to protrude from the outer surface of the side wall of the retainer 3. Horizontal fin rotation shafts 50 and horizontal fin input shafts 51 are provided so as to protrude from end surfaces of the horizontal fins 5 in the car width direction.

Figure 17:
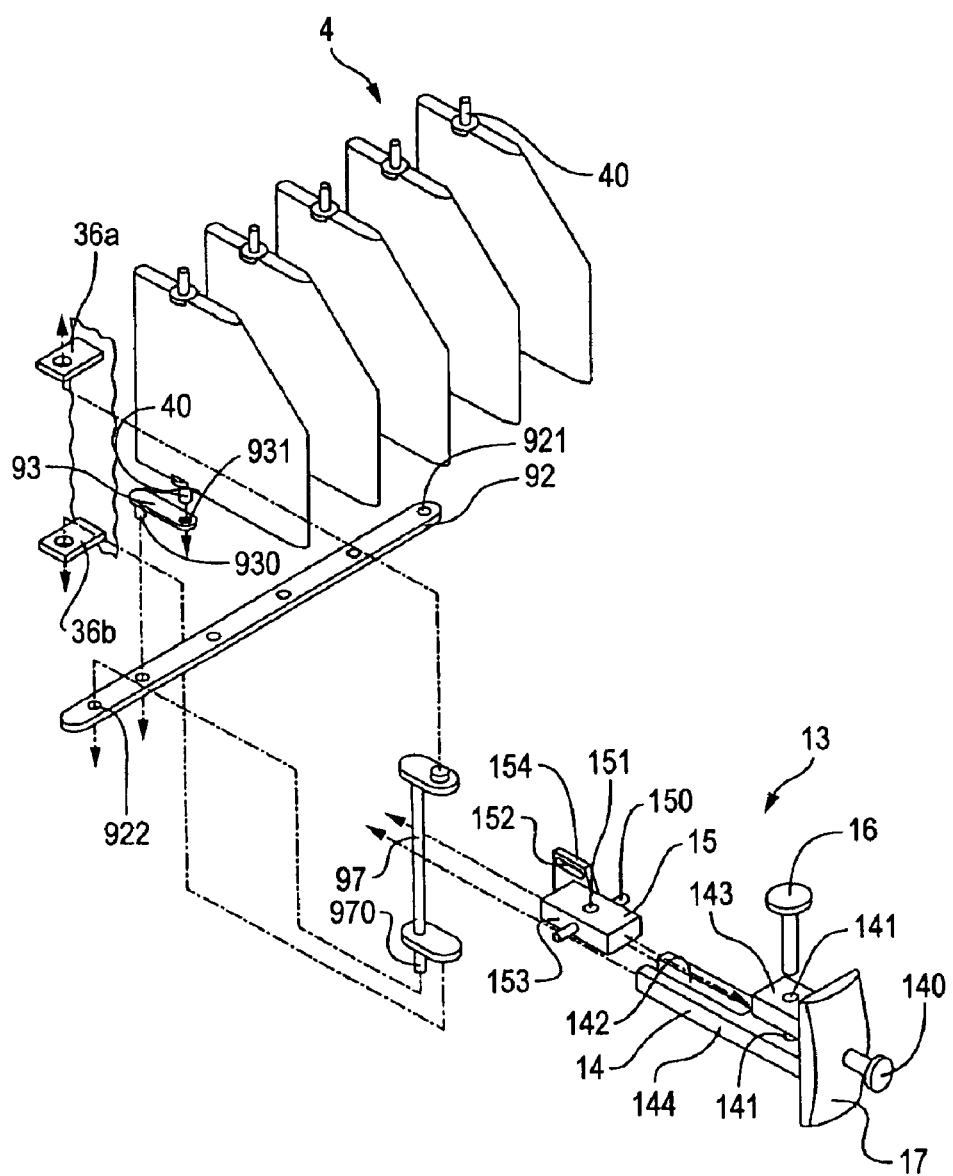
FIG. 17 is an exploded view showing a mechanism of connection between the fin operation device and the vertical fin unit.

Next, the mechanism of connection between the fin operation device 13 and the vertical fin unit 4 will be described in detail. FIG. 17 is an exploded view showing the mechanism of connection between the fin operation device and the vertical fin unit. Incidentally, members having no relation to the connection between the fin operation device and the vertical fin unit are not shown in FIG. 17.

As shown in FIG. 17, the panel portion 17 is made of a resin and shaped like a plate piece. A front surface of the panel portion 17 is spherical. A nailhead-shaped front end portion 140 is provided so as to protrude from the front surface of the panel portion 17.

The vertical fin drive portion 14 includes an upper plate portion 143, and a lower plate portion 144. The lower plate portion 144 is made of a resin and shaped like a strip of fancy paper. The lower plate portion 144 is provided so as to protrude from the rear surface of the panel portion 17 toward the car exterior side. The car exterior-side end of the lower plate portion 144 is forked. That is, a guide slit 142 is formed at the car exterior-side end of the lower plate portion 144. A pinhole 141 is formed near the base of the lower plate portion 144. The upper plate portion 143 is made of a resin and shaped like a strip of fancy paper. The upper plate portion 143 is provided so as to protrude from the rear surface of the panel portion 17 toward the car exterior side. The upper plate portion 143 is disposed above the lower plate portion 144 so as to be parallel to the lower plate portion 144. A pinhole 141 is formed in the center of the upper plate portion 143. The pinhole 141 in the upper plate portion 143 and the pinhole 141 in the lower plate portion 144 are opposite to each other in the vertical direction. The panel portion 17 and the vertical fin drive portion 14 are integrally formed by injection molding.

The horizontal fin drive portion 15 includes a body portion 153, and a small piece portion 154. The body portion 153 is made of a resin and shaped like a rectangular plate. The body portion 153 is inserted in a gap vertically formed between the upper plate portion 143 and the lower plate portion 144. Two protrusions 150 are provided so as to protrude from opposite surfaces of the body portion 153 in the car width direction. One of the protrusions 150 is inserted in the horizontal fin drive portion-rotating hole 382 shown in FIG. 16. The other protrusion 150 is pivotally supported by a seat plate (not shown) which is provided so as to protrude from the rear surface of the instrument panel. Accordingly, the horizontal fin drive portion 15 can swing vertically around the protrusions 150. A pinhole 151 is formed in the body portion 153 so as to pierce the body portion 153 vertically. The pinhole 151 and the two pinholes 141 are arranged on a line. A pin 16 is inserted in these pinholes 151 and 141. Accordingly, the vertical fin drive portion 14 can swing horizontally around the pin 16 with respect to the body portion 153. The small piece portion 154 is made of a resin and shaped like a rectangular thin plate. The small piece portion 154 is disposed at the car exterior-side and retainer-side corner portion of the body portion 153. The small piece portion 154 and the body portion 153 are integrally formed by injection molding. A guide slot 152 extending from the compartment side to the car exterior side is formed in the small piece portion 154.

The swinging rod 97 shaped like a round rod passes through the guide slit 142 of the lower plate portion 144 of the vertical fin drive portion 14. Upper and lower ends of the swinging rod 97 are pivotally supported by the rod support pieces 36a and 36b respectively. A connection protrusion 970 is provided so as to protrude from the lower end of the swinging rod 97. The connection protrusion 970 is inserted in a connection hole 922 of the vertical fin connection rod 92. Rod connection shafts 930 of the vertical fin drive pieces 93 are also inserted in the vertical fin connection rod 92. The vertical fin rotation shafts 40 of the vertical fins 4 are inserted in fin rotation holes 931 of the vertical fin drive pieces 93 respectively. That is, the swinging rod 97 and the vertical fin unit 4 are connected to each other through the vertical fin connection rod 92 and the vertical fin drive pieces 93. In this manner, the fin operation device 13 and the vertical fin unit 4 are connected to each other.

Figure 18:
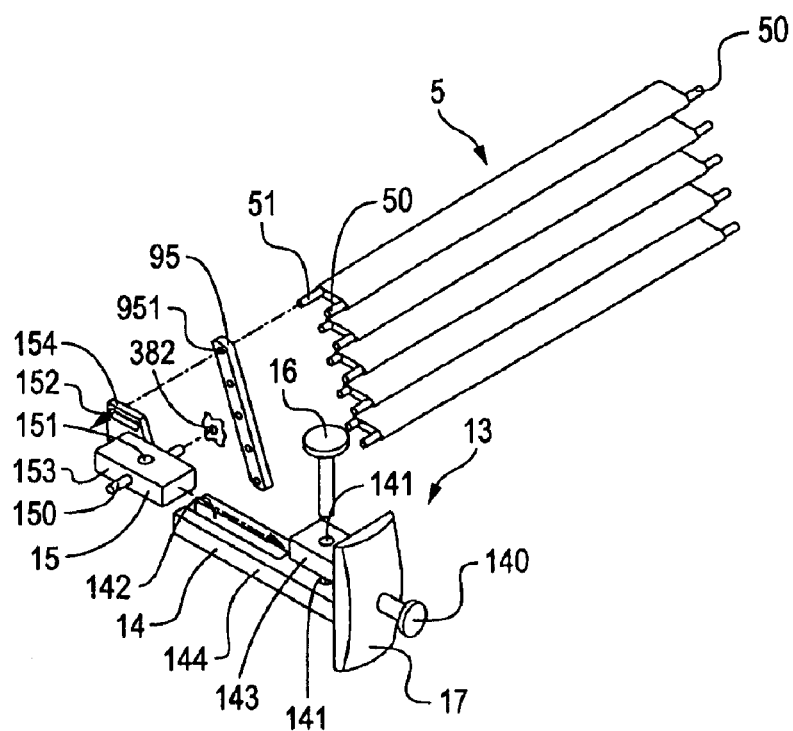
FIG. 18 is an exploded view showing a mechanism of connection between the fin operation device and the horizontal fin unit.

Next, the mechanism of connection between the fin operation device 13 and the horizontal fin unit 5 will be described in detail. FIG. 18 is an exploded view showing the mechanism of connection between the fin operation device and the horizontal fin unit. Incidentally, members having no relation to the connection between the fin operation device and the horizontal fin unit are not shown in FIG. 18.

The mechanism of connection between the vertical and horizontal fin drive portions 14 and 15 for forming the fin operation device 13 has been already described and the description thereof will be omitted here. The five horizontal fins 5 are connected to one another through the horizontal fin connection rod 95. The horizontal fin input shaft 51 of the uppermost horizontal fin 5 is inserted in a horizontal fin connection hole 951 of the horizontal fin connection rod 95 and a guide slot 152 of the horizontal fin drive portion 15. In this manner, the fin operation device 13 and the horizontal fin unit 5 are connected to each other.

Figure 19:
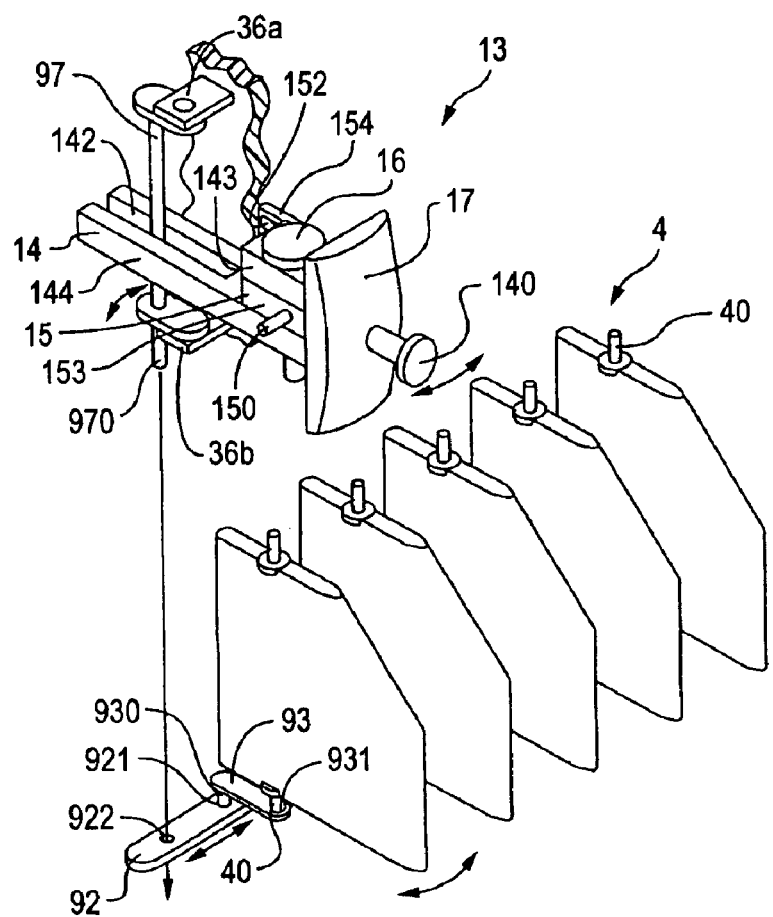
FIG. 19 is a perspective view showing the action of the air-conditioning register at the time of operating the vertical fin unit.

Next, the action of the air-conditioning register according to this embodiment will be described. First, the action of the air-conditioning register at the time of operating the vertical fin unit will be described. FIG. 19 shows the action of the air-conditioning register at the time of operating the vertical fin unit. When a passenger moves the front end portion 140 of the fin operation device 13 left/right, the vertical fin drive portion 14 first swings left/right around the pin 16. Then, the swinging rod 97 inserted in the guide slit 142 swings left/right. Then, the vertical fin connection rod 92 in which the connection protrusion 970 of the swinging rod 97 is inserted makes reciprocating motion (moves left/right) The vertical fin drive pieces 93 connected to the drive piece connection holes 921 of the vertical fin connection rod 92 swing left/right around the vertical fin rotation shafts 40 respectively. Accordingly, as well as the vertical fin drive pieces 93, the vertical fins 4 fixed to the vertical fin drive pieces 93 swing left/right around the vertical fin rotation shafts 40 respectively. In this manner, the passenger can operate the vertical fin unit 4.

Figure 20:
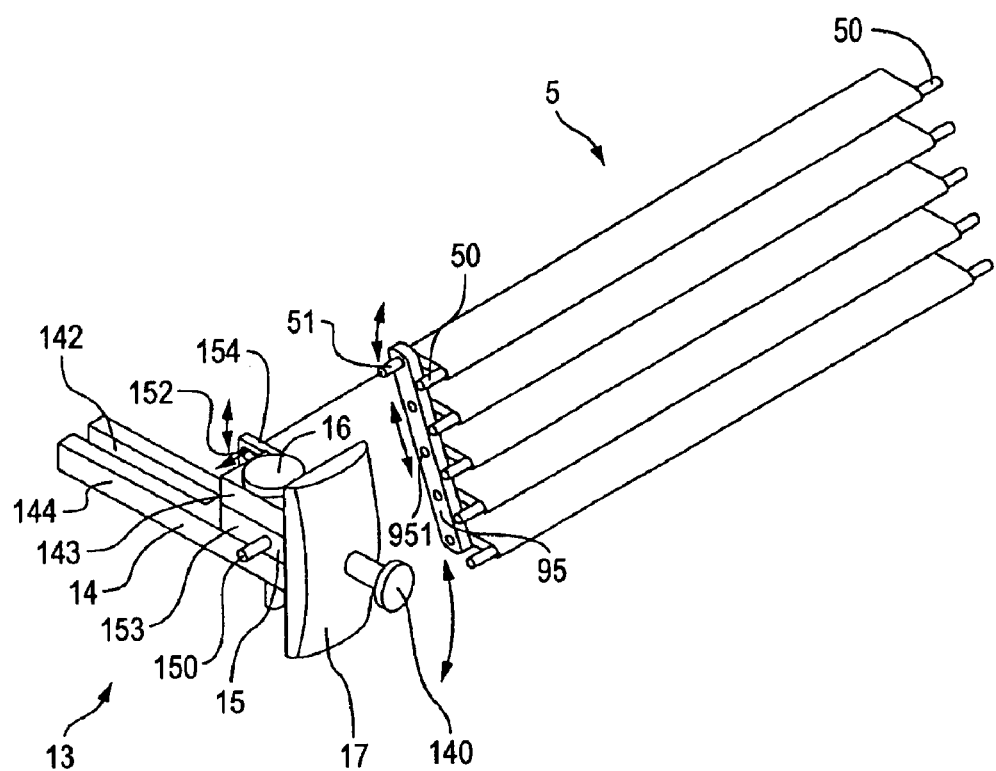
FIG. 20 is a perspective view showing the action of the air-conditioning register at the time of operating the horizontal fin unit.

Next, the action of the air-conditioning register at the time of operating the horizontal fin unit will be described. FIG. 20 shows the action of the air-conditioning register at the time of operating the horizontal fin unit. When a passenger moves the front end portion 140 of the fin operation device 13 up/down, the horizontal fin drive portion 15 first swings up/down around the protrusion 150. Then, the guide slot 152 swings up/down. Then, the horizontal fin input shaft 51 of the uppermost horizontal fin 5 inserted in the guide slot 152 swings up/down around the horizontal fin rotation shaft 50. That is, the uppermost horizontal fin 5 swings up/down. On this occasion, the horizontal fin input shafts 51 of the five horizontal fins 5 are inserted in the horizontal fin connection holes 951 of the horizontal fin connection rod 95 respectively. That is, the horizontal fins 5 are connected to one another by the horizontal fin connection rod 95. For this reason, when the uppermost horizontal fin 5 swings up/down, the other four horizontal fins 5 swing up/down. In this manner, the passenger can operate all the horizontal fins 5. Incidentally, the vertical fin unit 4 and the horizontal fin unit 5 can be operated simultaneously when the front end portion 140 of the fin operation device 13 is moved obliquely. When the front end portion 140 is moved obliquely, the actions shown in FIGS. 19 and 20 are performed simultaneously so that the vertical fin unit 4 and the horizontal fin unit 5 can be operated simultaneously.

Incidentally, the fin operation device 13 is not interlocked with the open/close damper. An open/close damper operation portion is disposed separately from the fin operation device 13. The description of the open/close damper operation portion will be omitted here.

Next, the effect of the air-conditioning register according to this embodiment will be described. In the air-conditioning register 1 according to this embodiment, the vertical fin unit 4 and the horizontal fin unit 5 can be operated simply when the single fin operation device 13 is swung. Accordingly, the air-conditioning register 1 is excellent in handling property.

Moreover, in the air-conditioning register 1 according to this embodiment, it is unnecessary to use any expensive ball joint for operating the vertical fin unit 4 and the horizontal fin unit 5 simultaneously. Accordingly, the cost for production of the air-conditioning register 1 is relatively low.

Moreover, in the air-conditioning register 1 according to this embodiment, the horizontal fin drive portion 15 is pivoted on the retainer 3 so that the horizontal fin drive portion 15 can swing vertically. The vertical fin drive portion 14 is pivoted on the horizontal fin drive portion 15 so that the vertical fin drive portion 14 can swing horizontally. Accordingly, the fin operation device 13 is relatively simple in structure. Accordingly, the reliability of the fin operation device 13 is high. In addition, the fin operation device 13 can be assembled easily.

Moreover, in the air-conditioning register 1 according to this embodiment, the protrusion 150 (equivalent to the stick swinging hole 124 shown in FIG. 10) as the center of swinging of the horizontal fin drive portion 15 is disposed near the compartment. Accordingly, the fin operation device 13 is shallow and compact. Accordingly, the space for installation of the fin operation device 13 can be reduced.

(4) Fourth Embodiment

This embodiment differs from the second embodiment in that a fin operation device is disposed instead of the swinging stick, the fin operation device is not connected to the open/close damper, and a rack and a pinion are interposed between the fin operation device and the vertical fin unit.

Figure 21:
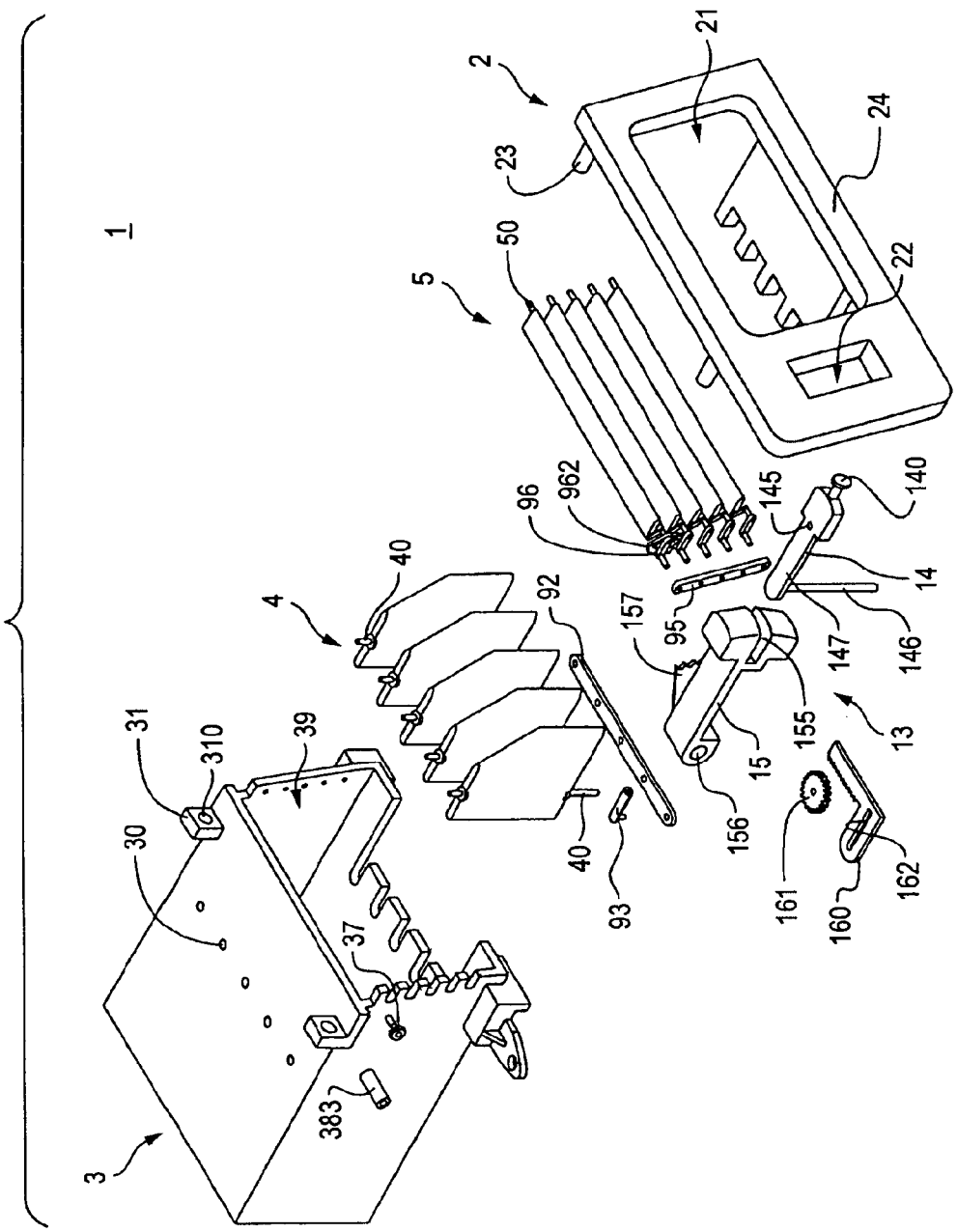
FIG. 21 is an exploded view of an air-conditioning register according to a fourth embodiment of the invention.

First, the configuration of the air-conditioning register according to this embodiment will be described. FIG. 21 is an exploded view showing the air-conditioning register according to this embodiment. Incidentally, parts corresponding to those in FIGS. 1, 8 and 16 are referred to by numerals the same as those in FIGS. 1, 8 and 16. The open/close damper is not shown in FIG. 21. The fin operation device 13 includes a vertical fin drive portion 14, and a horizontal fin drive portion 15.

The horizontal fin drive portion 15 is made of a resin and shaped like a "T" figure. The vertical fin drive portion 14 is made of a resin and shaped like a strip of fancy paper. The vertical fin drive portion 14 is received in the horizontal fin drive portion 15 in the condition that the front end portion 140 protrudes from the horizontal fin drive portion 15. A drive portion-swinging shaft 383 is provided so as to protrude from an outer surface of a side wall of the retainer 3.

Figure 22:
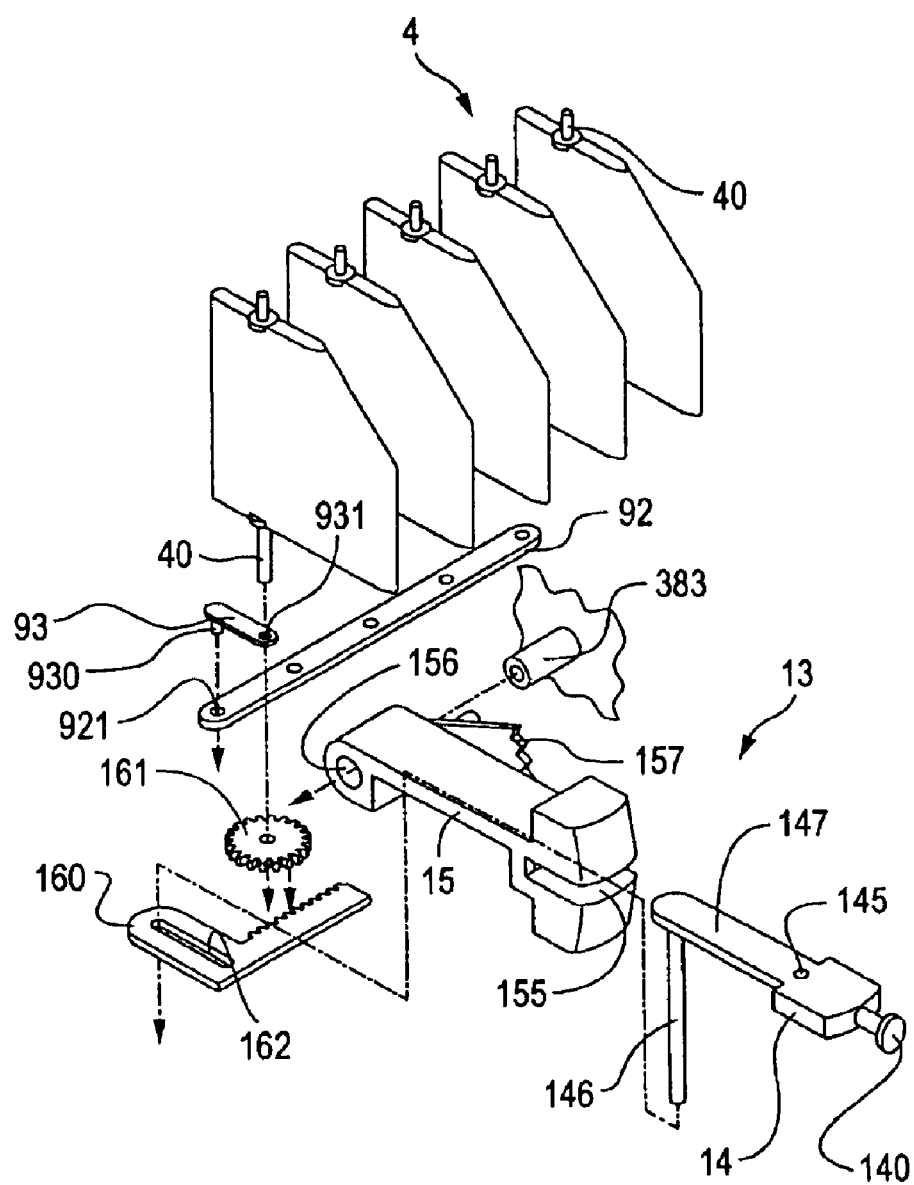
FIG. 22 is an exploded view showing a mechanism of connection between the fin operation device and the vertical fin unit.

Next, the mechanism of connection between the fin operation device 13 and the vertical fin unit 4 will be described in detail. FIG. 22 is an exploded view showing the mechanism of connection between the fin operation device and the vertical fin unit. Incidentally, members having no relation to the connection between the fin operation device and the vertical fin unit are not shown in FIG. 22.

As shown in FIG. 22, the compartment-side end of the horizontal fin drive portion 15 extends vertically. A vertical fin drive portion-receiving port 155 is formed at the compartment-side end of the horizontal fin drive portion 15. A drive portion-swinging hole 156 is formed at the car exterior-side end of the horizontal fin drive portion 15. The drive portion-swinging shaft 383 is inserted in the drive portion-swinging hole 156. Accordingly, the horizontal fin drive portion 15 can swing up/down around the drive portion-swinging hole 156. A swinging portion-side gear 157 is disposed on the retainer-side side surface of the horizontal fin drive portion 15.

The vertical fin drive portion 14 includes a body portion 147, a front end portion 140, and a vertical fin drive rod 146. The body portion 147 is shaped like a strip of fancy paper. The body portion 147 is received in the vertical fin drive portion-receiving port 155. The front end portion 140 is shaped like a nailhead. The front end portion 140 is provided so as to protrude from the compartment-side end of the body portion 147. The body portion 147 has a rotation hole 145 piercing the body portion 147 vertically. A pin (not shown) provided so as to protrude from an inner wall of the horizontal fin drive portion 15 is inserted and locked into the rotation hole 145. Accordingly, the body portion 147 can swing left/right around the rotation hole 145. The vertical fin drive rod 146 is provided so as to extend downward from the car exterior-side end of the body portion 147.

The rack 160 has a slot portion 162. The vertical fin drive rod 146 is inserted in the slot portion 162. The pinion 161 is engaged with the rack 160. The vertical fin rotation shaft 40 of the foremost one of the five vertical fins 4 is fixed to the center of the pinion 161. The vertical fin rotation shafts 40 of the five vertical fins 4 are inserted in fin rotation shafts 931 of the five vertical fin drive pieces 93 respectively. The rod connection shafts 930 of the five vertical fin drive pieces 93 are inserted in the drive piece connection holes 921 of the vertical fin connection rod 92 respectively. In this manner, the fin operation device 13 and the vertical fin unit 4 are connected to each other.

Next, the mechanism of connection between the fin operation device 13 and the horizontal fin unit 5 will be described. The mechanism of connection between the fin operation device 13 and the horizontal fin unit 5 is the same as the connection mechanism shown in FIG. 10. That is, the swinging portion-side gear 157 is engaged with the pinion 37 shown in FIG. 21. On the other hand, a drive piece-side gear 962 shaped like a sector is fixed to the uppermost disposed horizontal fin 5. The drive piece-side gear 962 is engaged with the pinion 37. That is, the swinging portion-side gear 157 and the drive piece-side gear 962 are connected to each other through the pinion 37. The five horizontal fins are connected to one another through the horizontal fin connection rod 95. In this manner, the fin operation device 13 and the horizontal fin unit 5 are connected to each other.

Figure 23:
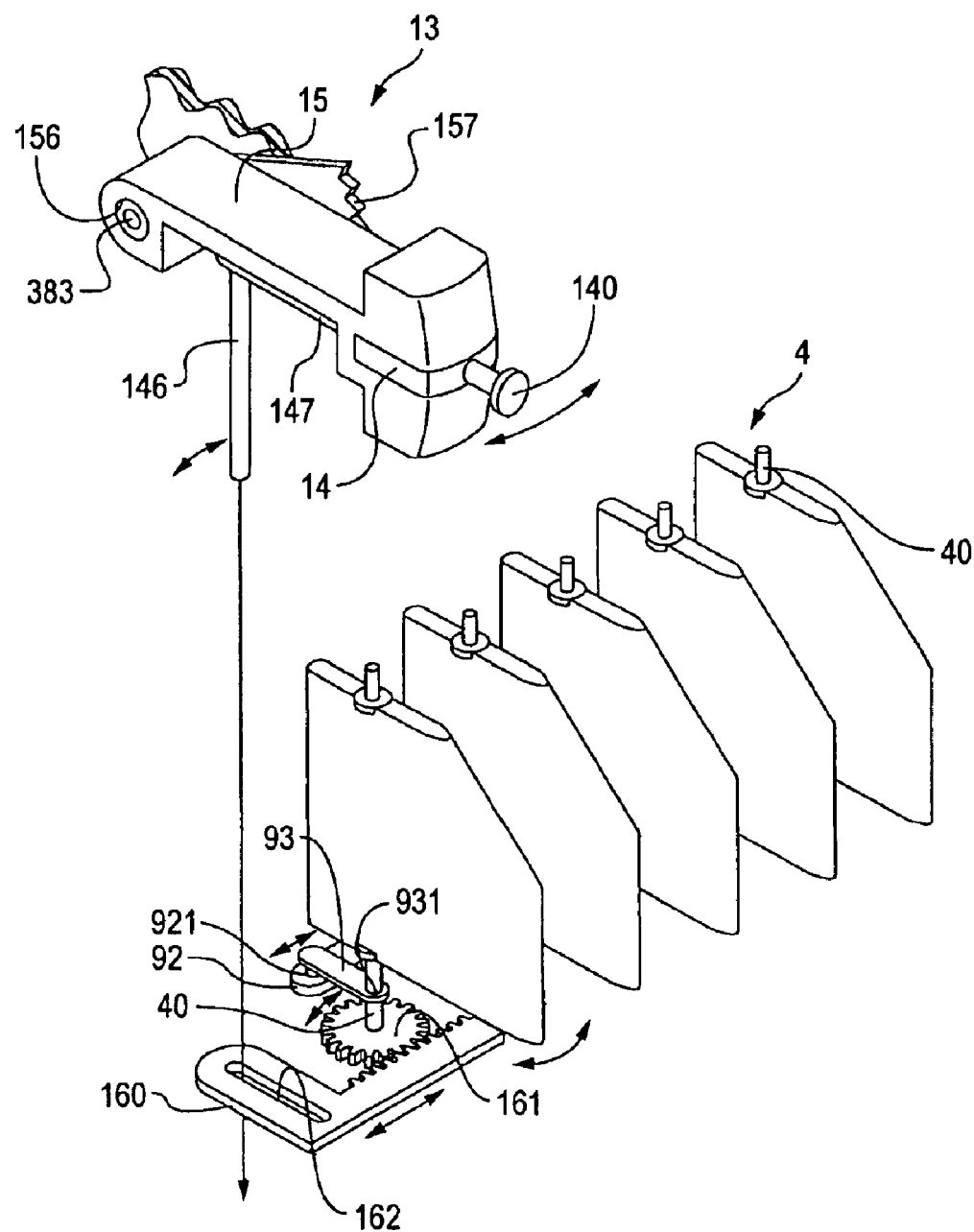
FIG. 23 is a perspective view showing the action of the air-conditioning register at the time of operating the vertical fin unit.

Next, the action of the air-conditioning register according to this embodiment will be described. First, the action of the air-conditioning register at the time of operating the vertical fin unit will be described. FIG. 23 shows the action of the air-conditioning register at the time of operating the vertical fin unit. When a passenger moves the front end portion 140 of the fin operation device 13 left/right, the vertical fin drive portion 14 first swings left/right around the rotation hole 145 shown in FIG. 22. Accordingly, the vertical fin drive rod 146 swings left/right. Then, the slot portion 162 in which the vertical fin drive rod 146 is inserted swings left/right, that is, the rack 160 swings left/right. Then, the pinion 161 engaged with the rack 160 rotates around vertical fin rotation shaft 40 and together with the vertical fin rotation shaft 40. The foremost vertical fin 4 swings left/right on the basis of the rotation. As described above, the foremost vertical fin 4 is connected to the other four vertical fins 4 through the vertical fin connection rod 92 and the vertical fin drive pieces 93. Accordingly, the other four vertical fins 4 swing left/right so as to be interlocked with the foremost vertical fin 4. In this manner, the passenger can operate the vertical fin unit 4.

Next, the action of the air-conditioning register at the time of operating the horizontal fin unit will be described. The action of the air-conditioning register at the time of operating the horizontal fin unit is the same as in the connection mechanism shown in FIG. 13. That is, the passenger's input is transmitted in the order of front end portion 140->swinging portion-side gear 157->pinion 37->drive piece-side gear 962->horizontal fin drive piece 96->horizontal fin connection rod 95 as shown in FIG. 21, so that all the horizontal fins 5 swing up/down. Incidentally, the vertical fin unit 4 and the horizontal fin unit 5 can be operated simultaneously when the front end portion 140 of the fin operation device 13 is moved obliquely. When the front end portion 140 is moved obliquely, the actions shown in FIGS. 23 and 13 are performed simultaneously so that the vertical fin unit 4 and the horizontal fin unit 5 can be operated simultaneously.

Incidentally, the fin operation device 13 is not interlocked with the open/close damper. An open/close damper operation portion is disposed separately from the fin operation device 13. The description of the open/close damper operation portion will be omitted here.

Next, the effect of the air-conditioning register according to this embodiment will be described. In the air-conditioning register 1 according to this embodiment, the vertical fin unit 4 and the horizontal fin unit 5 can be operated simply when the single fin operation device 13 is swung. Accordingly, the air-conditioning register 1 is excellent in handling property.

Moreover, in the air-conditioning register 1 according to this embodiment, it is unnecessary to use any expensive ball joint for operating the vertical fin unit 4 and the horizontal fin unit 5 simultaneously. Accordingly, the cost for production of the air-conditioning register 1 is relatively low.

Moreover, in the air-conditioning register 1 according to this embodiment, the horizontal fin drive portion 15 is pivoted on the retainer 3 so that the horizontal fin drive portion 15 can swing vertically. The vertical fin drive portion 14 is pivoted on the horizontal fin drive portion 15 so that the vertical fin drive portion 14 can swing horizontally. Accordingly, the fin operation device 13 is relatively simple in structure. Accordingly, the reliability of the fin operation device 13 is high. In addition, the fin operation device 13 can be assembled easily.

(5) Fifth Embodiment

This embodiment differs from the fourth embodiment in that there is no gear member interposed between the fin operation device and the vertical fin unit and between the fin operation device and the horizontal fin unit. The fin operation device is connected to the vertical fin unit and horizontal fin unit through link mechanisms respectively.

Figure 24:
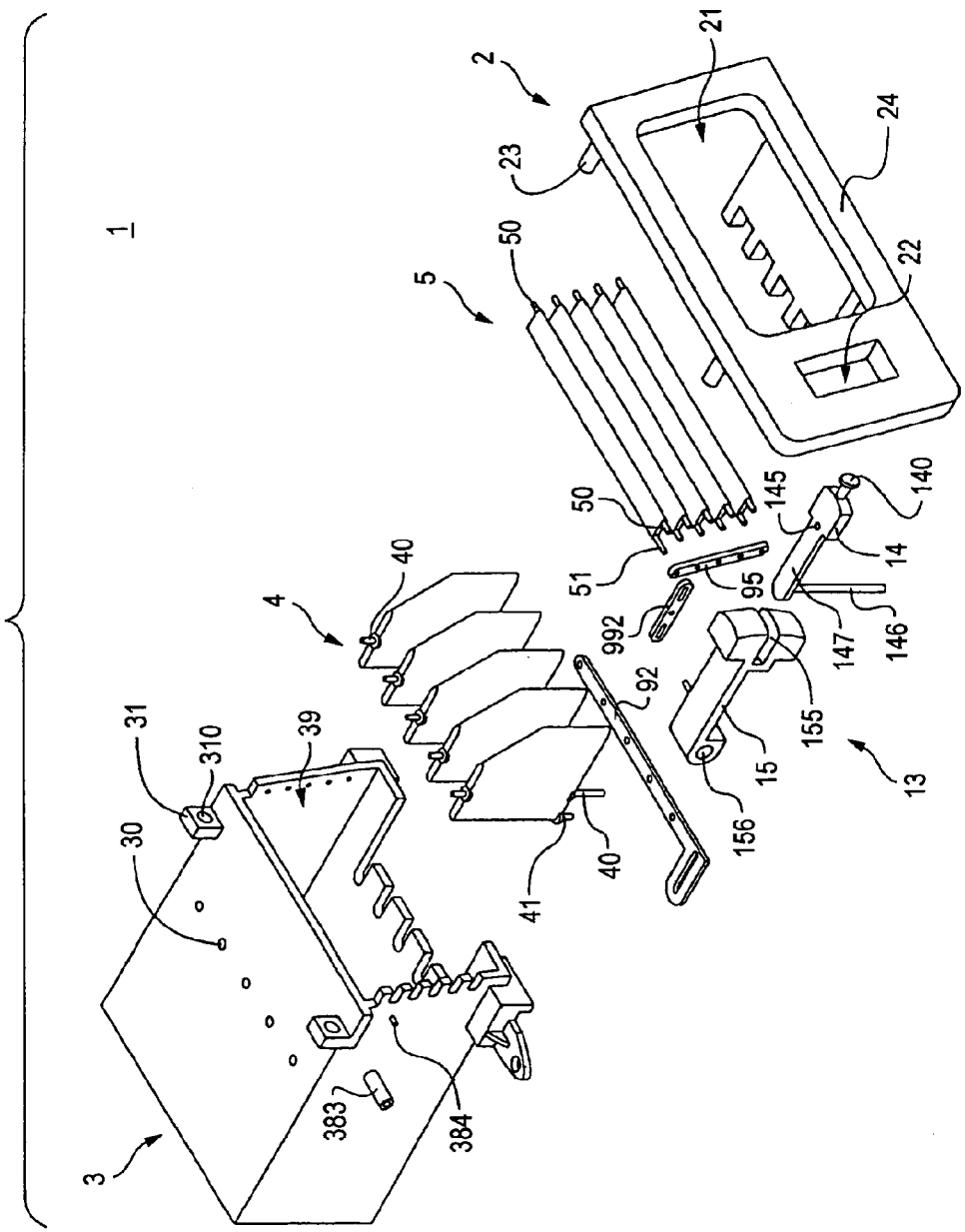
FIG. 24 is an exploded view of an air-conditioning register according to a fifth embodiment of the invention.

First, the configuration of the air-conditioning register according to this embodiment will be described. FIG. 24 is an exploded view showing the air-conditioning register according to this embodiment. Incidentally, parts corresponding to those in FIGS. 16 and 21 are referred to by numerals the same as those in FIGS. 16 and 21. The open/close damper is not shown in FIG. 24. The fin operation device 13 includes a vertical fin drive portion 14, and a horizontal fin drive portion 15.

The horizontal fin drive portion 15 is made of a resin and shaped like a "T" figure. The vertical fin drive portion 14 is made of a resin and shaped like a strip of fancy paper. The vertical fin drive portion 14 is received in the horizontal fin drive portion 15 in the condition that the front end portion 140 protrudes from the horizontal fin drive portion 15. A drive portion-swinging shaft 383 and an arm rotation shaft 384 are provided so as to protrude from an outer surface of a side wall of the retainer 3.

Figure 25:
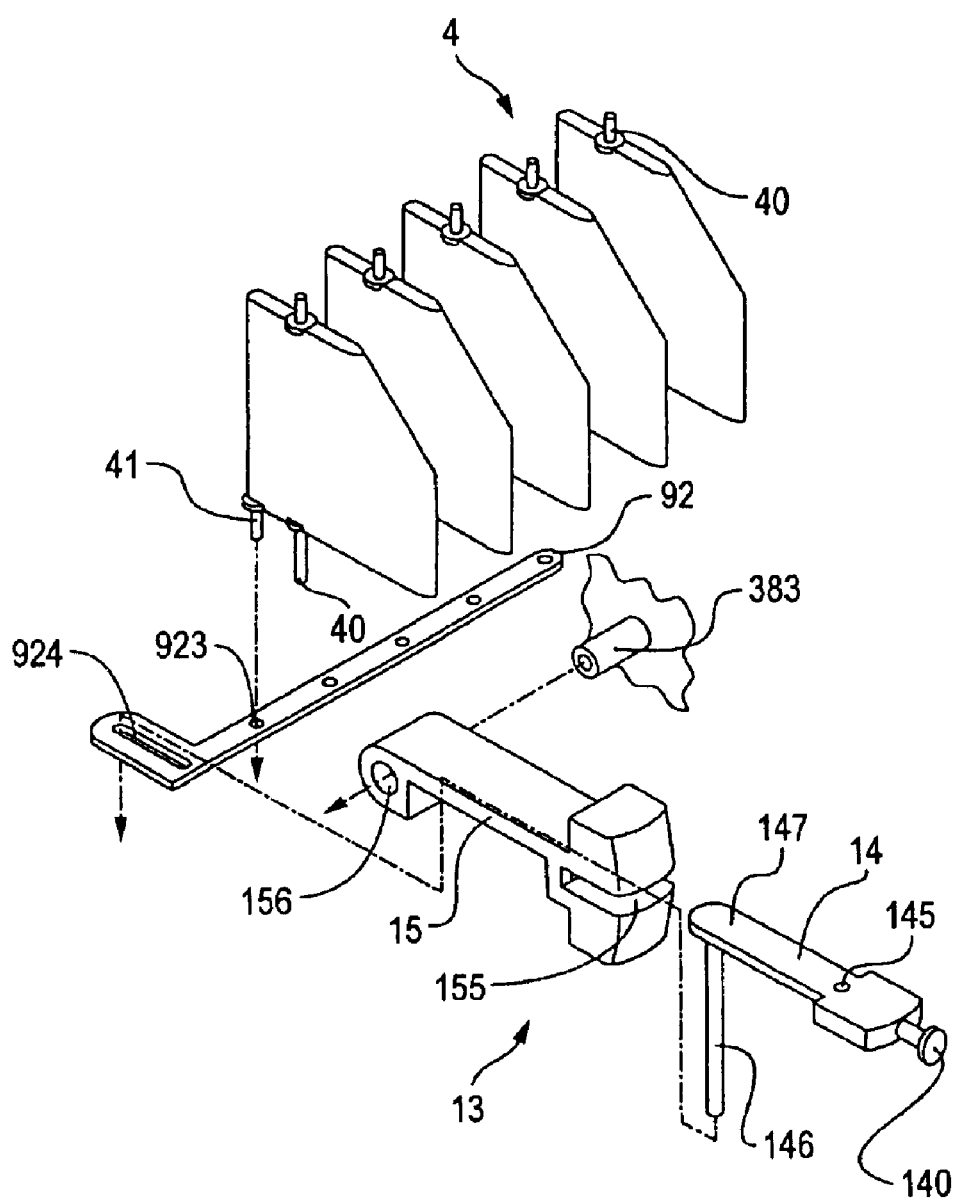
FIG. 25 is an exploded view showing a mechanism of connection between the fin operation device and the vertical fin unit.

Next, the mechanism of connection between the fin operation device 13 and the vertical fin unit 4 will be described in detail. FIG. 25 is an exploded view showing the mechanism of connection between the fin operation device and the vertical fin unit. Incidentally, members having no relation to the connection between the fin operation device and the vertical fin unit are not shown in FIG. 25.

As shown in FIG. 25, the compartment-side end of the horizontal fin drive portion 15 extends vertically. A vertical fin drive portion-receiving port 155 is formed at the compartment-side end of the horizontal fin drive portion 15. A drive portion-swinging hole 156 is formed at the car exterior-side end of the horizontal fin drive portion 15. The drive portion-swinging shaft 383 is inserted in the drive portion-swinging hole 156. Accordingly, the horizontal fin drive portion 15 can swing up/down around the drive portion-swinging hole 156.

The vertical fin drive portion 14 includes a body portion 147, a front end portion 140, and a vertical fin drive rod 146. The body portion 147 is shaped like a strip of fancy paper. The body portion 147 is received in the vertical fin drive portion-receiving port 155. The front end portion 140 is shaped like a nailhead. The front end portion 140 is provided so as to protrude from the compartment-side end of the body portion 147. The body portion 147 has a rotation hole 145 piercing the body portion 147 vertically. A pin (not shown) provided so as to protrude from an inner wall of the horizontal fin drive portion 15 is inserted and locked into the rotation hole 145. Accordingly, the body portion 147 can swing left/right around the rotation hole 145. The vertical fin drive rod 146 is provided so as to extend downward from the car exterior-side end of the body portion 147. On the other hand, vertical fin connection holes 923 and a slot portion 924 are formed in the vertical fin connection rod 92 so as to be arranged in the form of an "L" figure. The vertical fin drive rod 146 is inserted in the slot portion 924. Vertical fin rotation shafts 40 and vertical fin input shafts 41 are provided so as to protrude from lower end surfaces of the five vertical fins 4. The vertical fin input shafts 41 are inserted in the vertical fin connection holes 923 respectively. In this manner, the fin operation device 13 and the vertical fin unit 4 are connected to each other.

Figure 26:
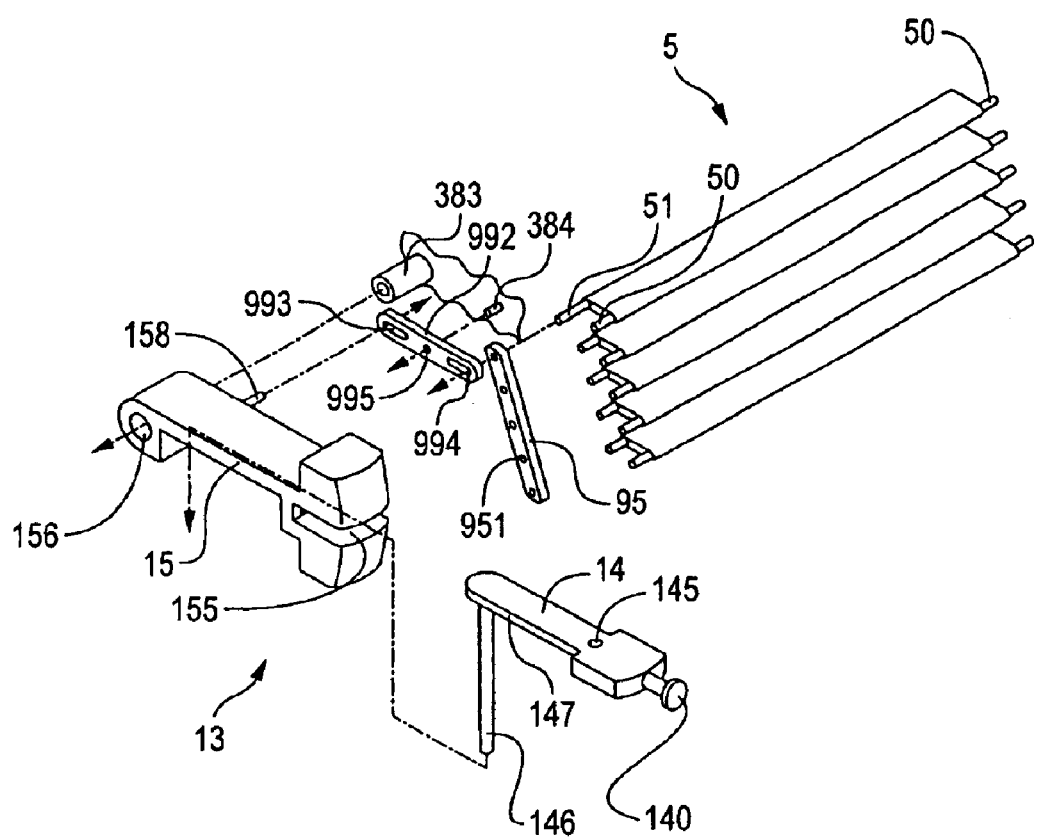
FIG. 26 is an exploded view showing a mechanism of connection between the fin operation device and the horizontal fin unit.

Next, the mechanism of connection between the fin operation device 13 and the horizontal fin unit 5 will be described in detail. FIG. 26 is an exploded view showing the mechanism of connection between the fin operation device and the horizontal fin unit. Incidentally, members having no relation to the connection between the fin operation device and the horizontal fin unit are not shown in FIG. 26.

The mechanism of connection between the vertical and horizontal fin drive portions 14 and 15 for forming the fin operation device 13 has been already described and the description thereof will be omitted here. The arm rotation shaft 384 is inserted in a rotation hole 995 of a rotation arm 992 which is made of a resin and shaped like a slender plate. Accordingly, the rotation arm 992 can swing around the rotation hole 995. An input slot 993 and an output slot 994 are formed at opposite ends of the rotation arm 992 with respect to the rotation hole 995. A protrusion 158 provided so as to protrude from the retainer-side side surface of the horizontal fin drive portion 15 is inserted in the input slot 993. On the other hand, the horizontal fin input shaft 51 of the uppermost one of the five horizontal fins 5 is inserted in the output slot 994. The horizontal fin input shafts 51 of the five horizontal fins 5 are inserted in the horizontal fin connection holes 951 of the horizontal fin connection rod 95 respectively. That is, the five horizontal fins 5 are connected to one another through the horizontal fin connection rod 95. In this manner, the fin operation device 13 and the horizontal fin unit 5 are connected to each other.

Figure 27:
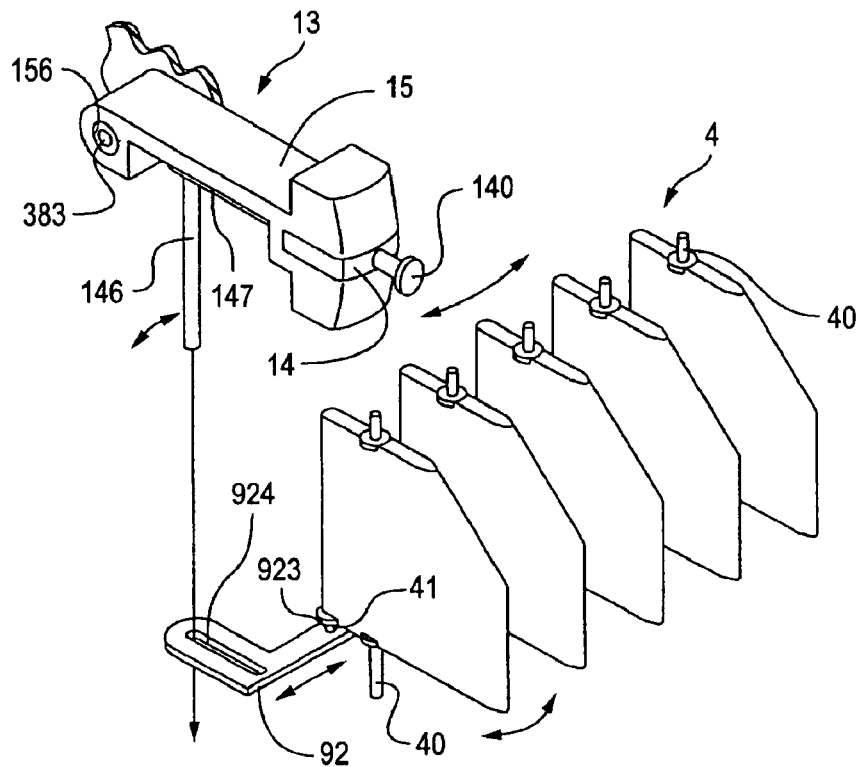
FIG. 27 is a perspective view showing the action of the air-conditioning register at the time of operating the vertical fin unit.

Next, the action of the air-conditioning register according to this embodiment will be described. First, the action of the air-conditioning register at the time of operating the vertical fin unit will be described. FIG. 27 shows the action of the air-conditioning register at the time of operating the vertical fin unit. When a passenger moves the front end portion 140 of the fin operation device 13 left/right, the vertical fin drive portion 14 first swings left/right around the rotation hole 145 shown in FIG. 25. Accordingly, the vertical fin drive rod 146 swings left/right. Then, the slot portion 924 in which the vertical fin drive rod 146 is inserted swings left/right, that is, the vertical fin connection rod 92 swings left/right. As described above, the five vertical fins 4 are connected to one another through the vertical fin connection rod 92. Accordingly, the five vertical fins 4 swing left/right around the vertical fin rotation shafts 40 respectively. In this manner, the passenger can operate the vertical fin unit 4.

Figure 28:
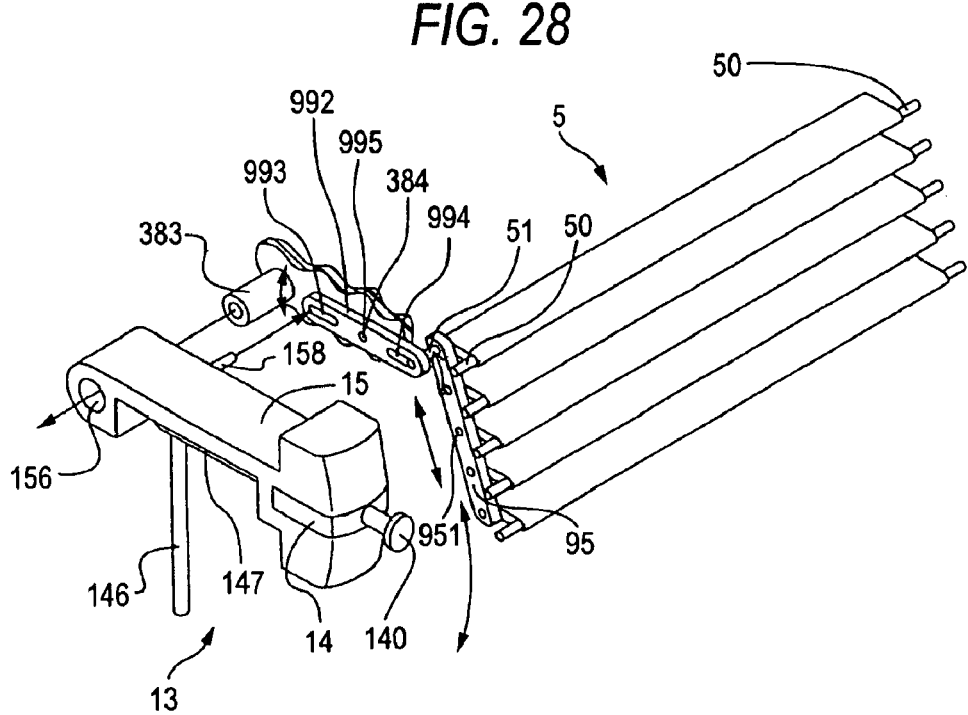
FIG. 28 is a perspective view showing the action of the air-conditioning register at the time of operating the horizontal fin unit.

Next, the action of the air-conditioning register at the time of operating the horizontal fin unit will be described. FIG. 28 shows the action of the air-conditioning register at the time of operating the horizontal fin unit. When a passenger moves the front end portion 140 of the fin operation device 13 up/down, the horizontal fin drive portion 15 first swings up/down around the drive portion-swinging hole 156. Then, the protrusion 158 swings vertically. Then, the input slot 993 in which the protrusion 158 is inserted swings around the rotation hole 995, that is, the rotation arm 992 swings around the rotation hole 995. Then, the input shaft 51 of the uppermost horizontal fin 5 inserted in the output slot 994 of the rotation arm 992 swings up/down around the horizontal fin rotation shaft 50. That is, the uppermost horizontal fin 5 swings up/down around the horizontal fin rotation shaft 50. On this occasion, the horizontal fin input shafts 51 of the five horizontal fins 5 are inserted in the horizontal fin connection holes 951 of the horizontal fin connection rod 95 respectively. That is, the horizontal fins 5 are connected to one another by the horizontal fin connection rod 95. For this reason, when the uppermost horizontal fin 5 swings up/down, the other four horizontal fins 5 swing up/down. In this manner, the passenger can operate all the horizontal fins 5. Incidentally, the vertical fin unit 4 and the horizontal fin unit 5 can be operated simultaneously when the front end portion 140 of the fin operation device 13 is moved obliquely. When the front end portion 140 is moved obliquely, the actions shown in FIGS. 27 and 28 are performed simultaneously so that the vertical fin unit 4 and the horizontal fin unit 5 can be operated simultaneously.

Incidentally, the fin operation device 13 is not interlocked with the open/close damper. An open/close damper operation portion is disposed separately from the fin operation device 13. The description of the open/close damper operation portion will be omitted here.

Next, the effect of the air-conditioning register according to this embodiment will be described. In the air-conditioning register 1 according to this embodiment, the vertical fin unit 4 and the horizontal fin unit 5 can be operated simply when the single fin operation device 13 is swung. Accordingly, the air-conditioning register 1 is excellent in handling property.

Moreover, in the air-conditioning register 1 according to this embodiment, it is unnecessary to use any expensive ball joint for operating the vertical fin unit 4 and the horizontal fin unit 5 simultaneously. Accordingly, the cost for production of the air-conditioning register 1 is relatively low.

Moreover, in the air-conditioning register 1 according to this embodiment, the horizontal fin drive portion 15 is pivoted on the retainer 3 so that the horizontal fin drive portion 15 can swing vertically. The vertical fin drive portion 14 is pivoted on the horizontal fin drive portion 15 so that the vertical fin drive portion 14 can swing horizontally.

Accordingly, the fin operation device 13 is relatively simple in structure. Accordingly, the reliability of the fin operation device 13 is high. In addition, the fin operation device 13 can be assembled easily.

(6) Sixth Embodiment

This embodiment differs from the fourth embodiment in that the fin operation device is connected to the vertical fin unit and the horizontal fin unit by belt mechanisms.

Figure 29:
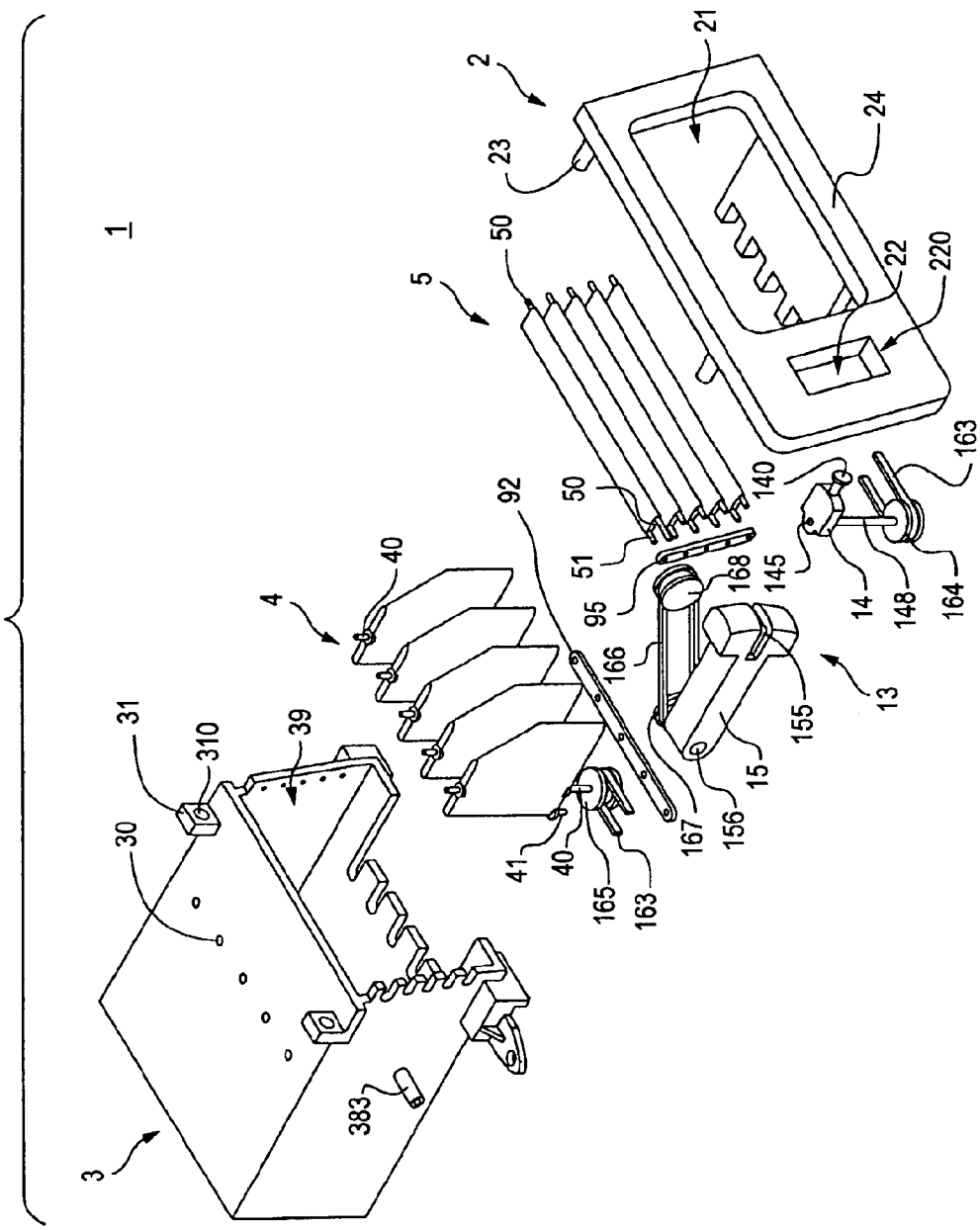
FIG. 29 is an exploded view of an air-conditioning register according to a sixth embodiment of the invention.

First, the configuration of the air-conditioning register according to this embodiment will be described. FIG. 29 is an exploded view showing the air-conditioning register according to this embodiment. Incidentally, parts corresponding to those in FIG. 24 are referred to by numerals the same as those in FIG. 24. The open/close damper is not shown in FIG. 29. The fin operation device 13 includes a vertical fin drive portion 14, and a horizontal fin drive portion 15.

The horizontal fin drive portion 15 is made of a resin and shaped like a T-shaped rectangular pipe. The vertical fin drive portion 14 is made of a resin and shaped like a rectangular plate. The vertical fin drive portion 14 is received in the horizontal fin drive portion 15 in the condition that the front end portion 140 protrudes from the horizontal fin drive portion 15. A drive portion-swinging shaft 383 is provided so as to protrude from an outer surface of a side wall of the retainer 3.

Figure 30:
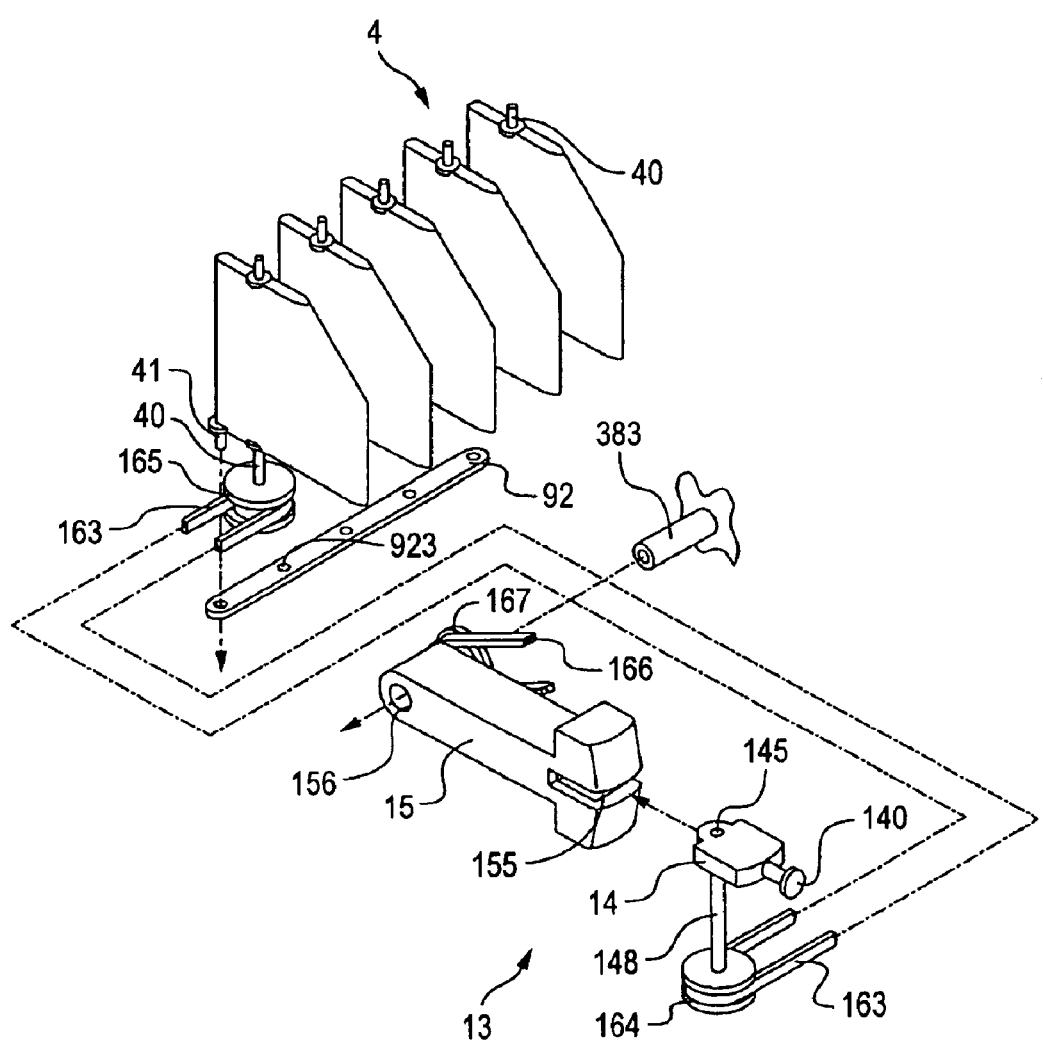
FIG. 30 is an exploded view showing a mechanism of connection between the fin operation device and the vertical fin unit.

Next, the mechanism of connection between the fin operation device 13 and the vertical fin unit 4 will be described in detail. FIG. 30 is an exploded view showing the mechanism of connection between the fin operation device and the vertical fin unit. Incidentally, members having no relation to the connection between the fin operation device and the vertical fin unit are not shown in FIG. 30.

As shown in FIG. 30, the compartment-side end of the horizontal fin drive portion 15 extends vertically. A vertical fin drive portion-receiving port 155 is formed at the compartment-side end of the horizontal fin drive portion 15. A drive portion-swinging hole 156 is formed at the car exterior-side end of the horizontal fin drive portion 15. The drive portion-swinging shaft 383 is inserted in the drive portion-swinging hole 156. Accordingly, the horizontal fin drive portion 15 can swing up/down around the drive portion-swinging hole 156. An input pulley 167 made of a resin and shaped like a disk is integrally formed around the drive portion-swinging hole 156. A horizontal fin drive belt 166 is laid over the input pulley 167.

A nailhead-shaped front end portion 140 is provided so as to protrude from the compartment-side end surface of the vertical fin drive portion 14. A vertical fin drive shaft 148 is provided so as to extend downward from the lower surface of the vertical fin drive portion 14. An input pulley 164 made of a resin and shaped like a disk is fixed to the lower end of the vertical fin drive shaft 148. A vertical fin drive belt 163 is laid over the input pulley 164. On the other hand, an output pulley 165 made of a resin and shaped like a disk is fixed to the lower end of the vertical fin rotation shaft 40 of the foremost one of the five vertical fins 4. The vertical fin drive belt 163 is also laid over the output pulley 165. The vertical fin input shafts 41 of the five vertical fins 4 are inserted in the vertical fin connection holes 923 of the vertical fin connection rod 92 respectively. That is, the five vertical fins 4 are connected to one another through the vertical fin connection rod 92. In this manner, the fin operation device 13 and the vertical fin unit 4 are connected to each other.

Figure 31:
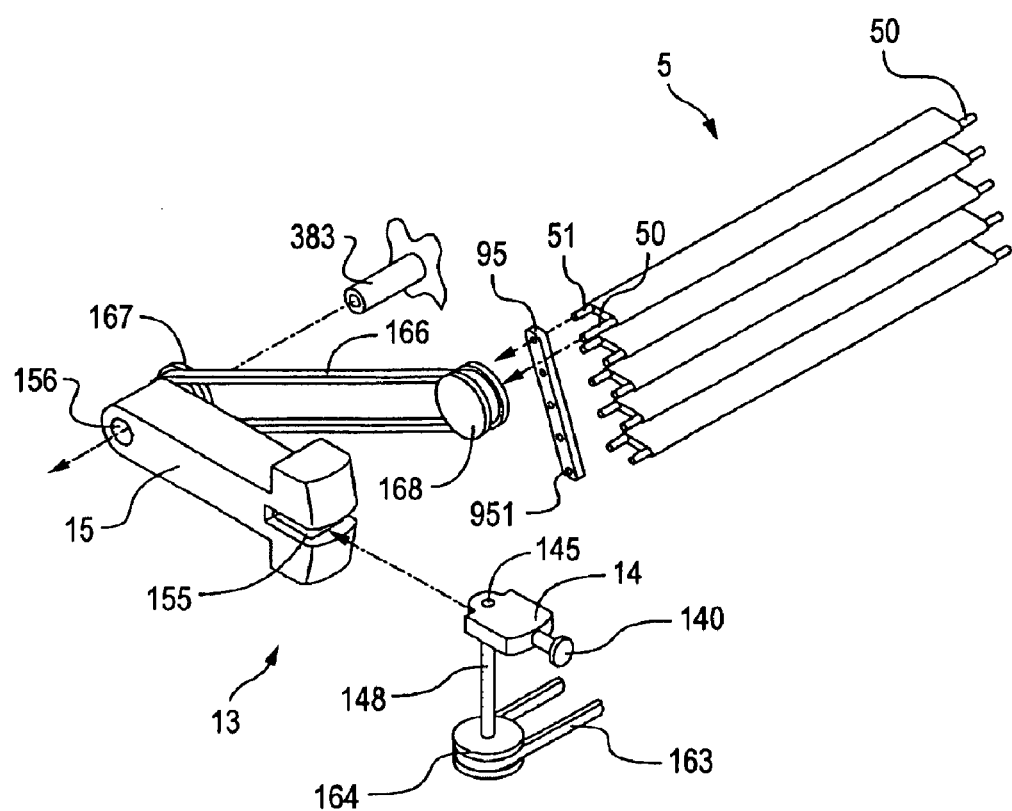
FIG. 31 is an exploded view showing a mechanism of connection between the fin operation device and the horizontal fin unit.

Next, the mechanism of connection between the fin operation device 13 and the horizontal fin unit 5 will be described in detail. FIG. 31 is an exploded view showing the mechanism of connection between the fin operation device and the horizontal fin unit. Incidentally, members having no relation to the connection between the fin operation device and the horizontal fin unit are not shown in FIG. 31.

The mechanism of connection between the vertical and horizontal fin drive portions 14 and 15 for forming the fin operation device 13 has been already described and the description thereof will be omitted here. An output pulley 168 made of a resin and shaped like a disk is fixed to an end of the horizontal fin rotation shaft 50 of the uppermost one of the five horizontal fins 5. The horizontal fin drive belt 166 is also laid over the output pulley 168. The horizontal fin input shafts 51 of the five horizontal fins 5 are inserted in the horizontal fin connection holes 951 of the horizontal fin connection rod 95 respectively. That is, the five horizontal fins 5 are connected to one another through the horizontal fin connection rod 95. In this manner, the fin operation device 13 and the horizontal fin unit 5 are connected to each other.

Figure 32:
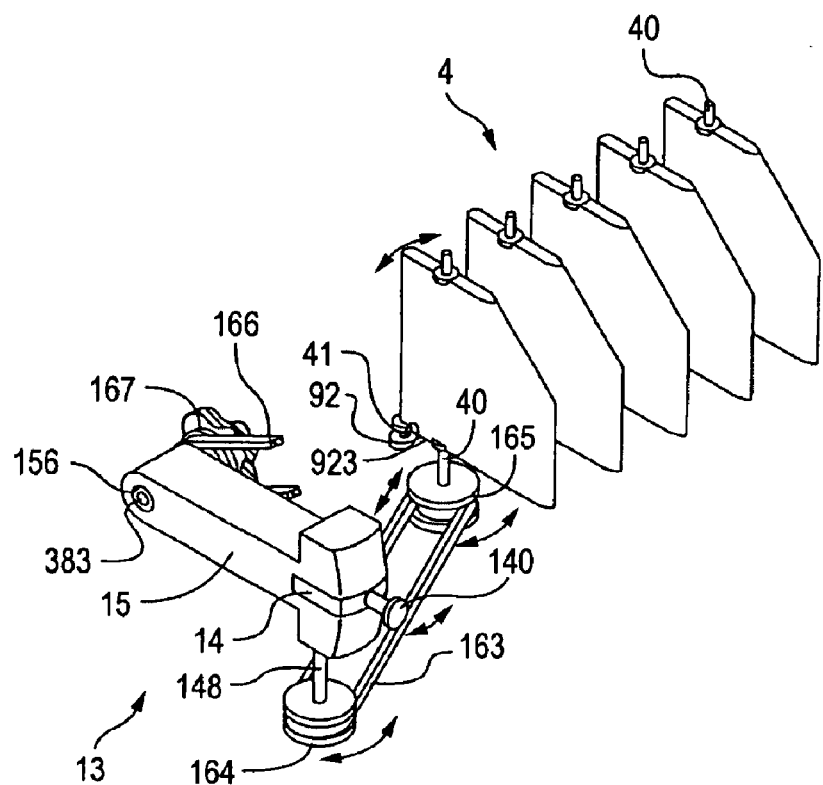
FIG. 32 is a perspective view showing the action of the air-conditioning register at the time of operating the vertical fin unit.

Next, the action of the air-conditioning register according to this embodiment will be described. First, the action of the air-conditioning register at the time of operating the vertical fin unit will be described. FIG. 32 shows the action of the air-conditioning register at the time of operating the vertical fin unit. When a passenger moves the front end portion 140 of the fin operation device 13 left/right, the vertical fin drive portion 14 first swings left/right around the rotation hole 145 shown in FIG. 30. Accordingly, the vertical fin drive shaft 148 and the input pulley 164 rotate. Then, the vertical fin drive belt 163 moves. With the movement of the vertical fin drive belt 163, the output pulley 165 rotates. The output pulley 165 is fixed to the vertical fin rotation shaft 40 of the foremost vertical fin 4. Accordingly, the foremost vertical fin 4 swings left/right around the vertical fin rotation shaft 40. The five vertical fins 4 are connected to one another through the vertical fin connection rod 92. Accordingly, the five vertical fins 4 swing left/right around the vertical fin rotation shafts 40 respectively. In this manner, the passenger can operate the vertical fin unit 4.

Figure 33:
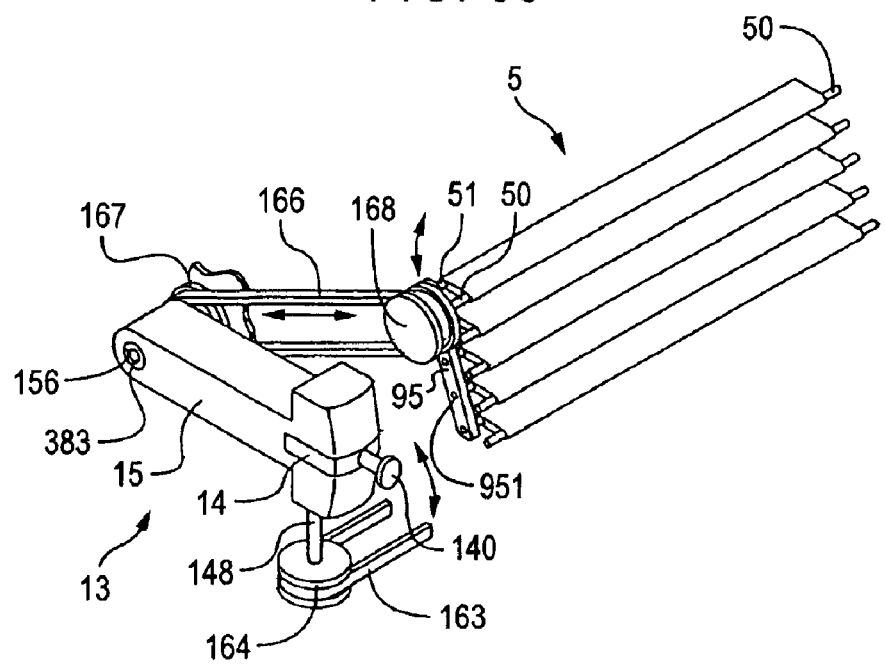
FIG. 33 is a perspective view showing the action of the air-conditioning register at the time of operating the horizontal fin unit.
Figure 34:
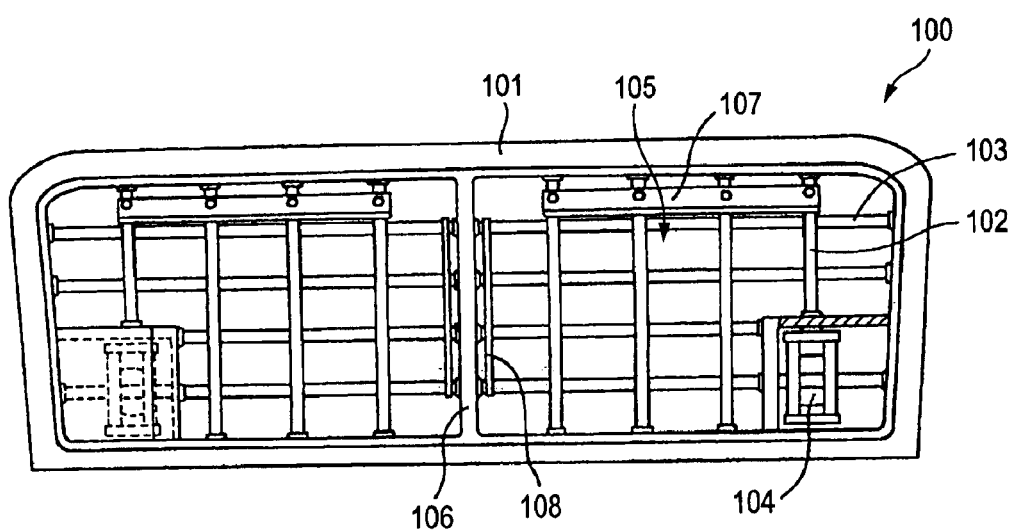
FIG. 34 is a rear view of a related-art air-conditioning register.

Next, the action of the air-conditioning register at the time of operating the horizontal fin unit will be described. FIG. 33 shows the action of the air-conditioning register at the time of operating the horizontal fin unit. When a passenger moves the front end portion 140 of the fin operation device 13 up/down, the horizontal fin drive portion 15 first swings up/down around the drive portion-swinging hole 156. Accordingly, the input pulley 167 formed around the drive portion-swinging hole 156 rotates. Then, the horizontal fin drive belt 166 laid over the input pulley 167 moves. Then, with the movement of the horizontal fin drive belt 166, the output pulley 168 rotates. The output pulley 168 is fixed to the horizontal fin rotation shaft 50 of the uppermost one of the five horizontal fins 5. Accordingly, when the output pulley 168 rotates, the uppermost horizontal fin 5 swings up/down around the horizontal fin rotation shaft 50. The five horizontal fins 5 are connected to one another through the horizontal fin connection rod 95. Accordingly, when the uppermost horizontal fin 5 swings up/down, the other four horizontal fins 5 swing up/down. In this manner, the passenger can operate all the horizontal fins 5. Incidentally, the vertical fin unit 4 and the horizontal fin unit 5 can be operated simultaneously when the front end portion 140 of the fin operation device 13 is moved obliquely. When the front end portion 140 is moved obliquely, the actions shown in FIGS. 32 and 33 are performed simultaneously so that the vertical fin unit 4 and the horizontal fin unit 5 can be operated simultaneously.

Incidentally, the fin operation device 13 is not interlocked with the open/close damper. An open/close damper operation portion is disposed separately from the fin operation device 13. The description of the open/close damper operation portion will be omitted here.

Next, the effect of the air-conditioning register according to this embodiment will be described. In the air-conditioning register 1 according to this embodiment, the vertical fin unit 4 and the horizontal fin unit 5 can be operated simply when the single fin operation device 13 is swung. Accordingly, the air-conditioning register 1 is excellent in handling property.

Moreover, in the air-conditioning register 1 according to this embodiment, it is unnecessary to use any expensive ball joint for operating the vertical fin unit 4 and the horizontal fin unit 5 simultaneously. Accordingly, the cost for production of the air-conditioning register 1 is relatively low.

Moreover, in the air-conditioning register 1 according to this embodiment, the horizontal fin drive portion 15 is pivoted on the retainer 3 so that the horizontal fin drive portion 15 can swing vertically. The vertical fin drive portion 14 is pivoted on the horizontal fin drive portion 15 so that the vertical fin drive portion 14 can swing horizontally. Accordingly, the fin operation device 13 is relatively simple in structure. Accordingly, the reliability of the fin operation device 13 is high. In addition, the fin operation device 13 can be assembled easily.

(7) Others

Although embodiments of the air-conditioning register according to the invention have been described, the invention is not particularly limited to the embodiments. Various changes and modifications that can be conceived by those skilled in the art may be made.

For example, in the first embodiment, the common operation stick 7 is disposed as a common operation portion. In the second embodiment, the swinging stick 10 is disposed as a common operation portion (swinging operation portion). However, a slide knob or the like maybe used as a common operation portion.

In the first embodiment, the open/close damper 6 is operated by pushing the common operation stick 7. However, the open/close damper 6 may be operated by twisting the common operation stick 7. In this case, for example, the shaft of the common operation stick 7 and the shaft of the open/close damper 6 may be connected to each other by a bevel gear.

In each of the first and second embodiments, the register panel 2 is incorporated in the instrument panel. However, the register panel 2 and the instrument panel may be integrally produced.

In the second embodiment, the operation of the open/close damper 6 is interlocked with the operation of the horizontal fin unit 5. However, the operation of the open/close damper 6 may be interlocked with the operation of the vertical fin unit 4. In the second embodiment, the swinging stick 10 is disposed as a swinging operation portion. However, a swinging operation portion, for example, shaped not like a stick but like a ball may be disposed so that the open/close damper, the vertical fin unit and the horizontal fin unit can be operated by rotation of the swinging operation portion. The swinging operation portion may be disposed so as not to protrude from the register panel.

In each of the third, fourth, fifth and sixth embodiments, the open/close damper is not operated by the fin operation device. However, the open/close damper as well as the vertical fin unit and the horizontal fin unit maybe operated by the fin operation device. In this case, the open/close damper operating mechanism shown in each of the first and second embodiments may be used.

According to the invention, there can be provided an air-conditioning register having a common operation portion by which the open/close damper as well as the vertical fin unit and the horizontal fin unit can be operated.

What is claimed is:

1. An air-conditioning register comprising:
   a register panel on which an opening for flowing out conditioned air is formed;
   a retainer coupled to said register panel which includes an inlet and an outlet so as to form an air passage communicating with said opening;
   a vertical fin unit including a first group of fins received in said retainer and capable of adjusting a wind direction of said conditioned air horizontally;
   a horizontal fin unit including a second group of fins received in said retainer and capable of adjusting a wind direction of said conditioned air vertically; and
   an open/close damper received in said retainer,
   a common operation portion capable of operating said vertical fin unit, said horizontal fin unit and said open/close damper.

2. An air-conditioning register according to claim 1, wherein said common operation portion is disposed outside of said opening on said register panel.

3. An air-conditioning register according to claim 1, wherein said common operation portion is made of a common operation stick, and
   wherein said open/close damper is opened when said common operation stick is operated to protrude from said register panel, said open/close damper is closed when said operation stick is operated to be inserted in said register panel,
   said horizontal fin unit is moved up/down when said common operation stick is operated to move up/down in said position of protrusion, and
   said vertical fin unit is moved left/right when said common operation stick is operated to move left/light in said position of protrusion.

4. An air-conditioning register according to claim 3, wherein a front end portion of said common operation stick is substantially flush with said register panel when said common operation stick is inserted in said register panel.

5. An air-conditioning register according to claim 3, wherein said common operation stick is insertable in said register panel even in a case where said common operation stick in said position of protrusion is inclined with respect to a direction of insertion.

6. An air-conditioning register according to claim 1, wherein:
   said common operation portion is a swinging operation portion disposed in the outside of said opening and capable of swinging; and
   said vertical fin unit is swung left/right when said swinging operation portion is operated to swing left/right,
   wherein said horizontal fin unit is swung up/down when said swinging operation portion is operated to swing up/down, and
   said open/close damper is closed when said swinging operation portion is operated to swing beyond a maximum swinging position of said vertical fin unit or said horizontal fin unit.

7. An air-conditioning register according to claim 6, wherein one fin unit of the first and horizontal fin units which is closer to said opening on said register panel fully closes said air passage when said fin unit is in said maximum swinging position.

8. An air-conditioning register according to claim 1, wherein one fin unit of the first and horizontal fin units which is closer to said opening on said register panel fully closes said air passage when said fin unit is in said maximum swinging position.

9. An air-conditioning register according to claim 6, wherein said swinging operation portion is disposed so as to protrude from said register panel.

10. An air-conditioning register according to claim 1, wherein said common operation portion is connected to said vertical fin unit, said horizontal fin unit and said open/close damper.

11. An air-conditioning register comprising:
    a register panel on which an opening for flowing out conditioned air is formed;
    a retainer coupled to said register panel which includes an inlet and an outlet so as to form an air passage communicating with said opening;
    a vertical fin unit including a first group of fins received in said retainer and capable of adjusting a wind direction of said conditioned air horizontally; and
    a horizontal fin unit including a second group of fins received in said retainer and capable of adjusting a wind direction of said conditioned air vertically;
    a fin operation device capable of operating said vertical fin unit and said horizontal fin unit simultaneously, said fin operation device including a vertical fin drive portion for driving said vertical fin unit while detecting a horizontal component of an input, and a horizontal fin drive portion provided separately from said vertical fin drive portion for driving said horizontal fin unit while detecting a vertical component of said input.

12. An air-conditioning register according to claim 11, wherein said horizontal fin drive portion is pivoted on said retainer so as to be able to swing vertically whereas said vertical fin drive portion is pivoted on said horizontal fin drive portion so as to be able to swing horizontally.

13. An air-conditioning register according to claim 11, wherein said common operation portion is disposed outside of said opening on said register panel.

14. An air-conditioning register according to claim 11, wherein one fin unit of the first and horizontal fin units which is closer to said opening on said register panel fully closes said air passage when said fin unit is in said maximum swinging position.

15. An air-conditioning register according to claim 11, wherein said fin operation device is connected to said vertical fin unit and said horizontal fin unit through gear members.

16. An air-conditioning register according to claim 11, wherein said fin operation device is connected to said vertical fin unit and said horizontal fin unit though link mechanisms.

17. An air-conditioning register according to claim 11, wherein said fin operation device is connected to said vertical fin unit and said horizontal fin unit by belt mechanisms.

* * * * *